US006735523B1

(12) United States Patent
Lin et al.

(10) Patent No.: US 6,735,523 B1
(45) Date of Patent: *May 11, 2004

(54) PROCESS AND SYSTEM OF COUPLED REAL-TIME GPS/IMU SIMULATION WITH DIFFERENTIAL GPS

(75) Inventors: Ching-Fang Lin, Simi Valley, CA (US); Jen-Hao Mao, Simi Valley, CA (US)

(73) Assignee: American GNC Corp., Simi Valley, CA (US)

( * ) Notice: Subject to any disclaimer, the term of this patent is extended or adjusted under 35 U.S.C. 154(b) by 616 days.

This patent is subject to a terminal disclaimer.

(21) Appl. No.: 09/611,568

(22) Filed: Jul. 7, 2000

Related U.S. Application Data

(60) Provisional application No. 60/212,886, filed on Jun. 19, 2000.

(51) Int. Cl.[7] ................................. G01S 5/02
(52) U.S. Cl. ............... 701/216; 701/220; 701/223; 701/213; 703/2; 342/357.04; 342/357.14; 342/357.06
(58) Field of Search ................. 703/2, 6; 342/357.14, 342/357.04, 357.06; 701/220, 221, 222, 223, 213, 214, 216

(56) References Cited

U.S. PATENT DOCUMENTS 6,127,970 A * 10/2000 Lin ................. 342/357.14
6,317,688 B1 * 11/2001 Bruckner et al. ........... 701/213
6,424,914 B1 * 7/2002 Lin ........................ 701/214
6,496,778 B1 * 12/2002 Lin ........................ 701/215
6,560,535 B2 * 5/2003 Levy et al. ............... 701/213

OTHER PUBLICATIONS

Abidin, H.Z. (1994) "On the fly ambiguity resolution", GPS World, Vol 5, No. 4, pp. 40–50.
Abigin, H.Z. (1991). "New strategy for "on the fly" ambiguity resolution". Proceedings fo ION GPS–91, Fourth International Technical Meeting of the Satellite Division of the Institute of Navigation, Albuquerque, New Mexico, Sep. 11–13, pp. 875–886.

* cited by examiner

Primary Examiner—Krisna Lim
Assistant Examiner—T. Phan
(74) Attorney, Agent, or Firm—Raymond Y. Chan; David and Raymond Patent Group

(57) ABSTRACT

A coupled real-time GPS/IMU simulation method with differential GPS includes the steps of receiving real-time trajectory data from a 6DOF trajectory generator and generating GPS simulated measurements (rover and reference) and inertial measurement unit simulated electronic signals based on the real GPS models and IMU models, respectively, and injecting those simulated data into an on-board integrated GPS/INS (global positioning system/inertial navigation system). Therefore, the coupled real-time GPS/IMU simulation method with differential GPS can be applied to evaluate the performance of the integrated GPS/INS in the area of high accuracy positioning in addition to the regular evaluation (one receiver mode).

32 Claims, 16 Drawing Sheets

PROCESS AND SYSTEM OF COUPLED REAL-TIME GPS/IMU SIMULATION WITH DIFFERENTIAL GPS

CROSS REFERENCE OF RELATED APPLICATION

This is a regular application of a provisional application having an application Ser. No. of 60/212886 and a filing date of Jun. 19, 2000.

FIELD OF THE PRESENT INVENTION

The present invention relates to a global positioning system (GPS) and receiver simulation, a gyro and accelerometer (IMU (inertial measurement unit)) simulation, and more particularly to a coupled real-time GPS/IMU simulation method with Differential GPS for a hardware-in-the-loop integrated positioning system test on the ground.

BACKGROUND OF THE PRESENT INVENTION

Due to budget limitations and very large time consumption for testing results, problems with the ground tests and laboratory hardware-in-the-loop tests for the on-board coupled global positioning system/inertial navigation system (GPS/INS) remain unsolved.

For ground tests, the inertial sensor within the on-board coupled GPS/IMU (Global Positioning System/Inertial Measurement Unit) can not produce dynamic electronic signals without vehicle maneuvering. This is based on the knowledge that the IMU is a self-contained device and in the static case, the global positioning system receiver (GPSR) can not output dynamic measurements. Thus, for static tests the accuracy of the on-board coupled GPS/INS for a vehicle can not be evaluated. Therefore, in order to apply the coupled GPS/INS to the vehicles, a series of dynamic tests for the fully coupled positioning system (GPS/INS) have to be executed before the "real" missions are activated.

As regards the expense of a test, a dynamic test (measuring the dynamic data) on the ground for the on-board fully coupled positioning system can be performed at a low budget. However, for an actual-fly test, not only is the operational cost high, but also is time/labor-consuming. Because it is necessary that the essential parts of the gyros, accelerometers, and GPS receiver experience a trajectory identical to that expected by the real mission, simulation tests are the key to meet the standards of reliable testing performed with in a low budget and with time savings.

A straightforward method for generating dynamic inertial measurements is to put an actual inertial sensor on a motion table. This method is reliable but has several disadvantages. They are described as follows:
1. A large set of testing equipment.
2. Expensive operational costs.
3. Limited dynamic-motion.
4. Inconvenient data acquisition process.
5. Inability to perform simultaneous generation of dynamic GPS measurements.

Some systems for GPS signal simulation generate suppressed radio frequency (RF) analog signals to test a GPS receiver. The RF output mimics the GPS signal emitted from the GPS satellites with modulating pseudo random noise code and navigation message data (such as ephemeris, clock parameters, and even atmospheric data) on an L-band carrier (1,575.42 MHz) or two L-band carriers (1,575.42 MHz and 1,227.60 MHz). The simulated signal has the same amplitude and signal-to-noise ratio (SNR) as the GPS signal so that it can be directly injected into the GPS receiver through the antenna port.

In order to simulate the real GPS measurements with high fidelity, a 6DOF trajectory generator which provides real-time trajectory data, real-time GPS satellite constellation simulation, selective availability (SA) simulation, intermediate frequency (IF) signal generation, and GPS receiver tracking loop simulation are used to generate simulated GPS measurement data (pseudorange, phase, and Doppler shift) based on the GPS model and receiver model. Also, the output of the simulated GPS measurement data is formatted. At the same time, using the 6DOF trajectory data, dynamic gyro and accelerometer measurements are generated according to their corresponding measurement and error models. Then, the simulated measurement data are input to the on-board fully coupled positioning system. Therefore, using the dynamic hardware-in-the-loop test, the fully coupled positioning system can be evaluated in the laboratory during the whole procedure (i.e. from measuring the data to validating the fully coupled positioning system).

The present invention is an extension of the U.S. Patent Application entitled "Coupled Real-time Emulation Method for Positioning and Location System" now allowed, wherein the simulation method is based on one GPS receiver. Using the pseudorange measurements, a Kalman filter is used to estimate a stand-alone receiver position and, therefore, the accuracy of the stand-alone estimated receiver position is usually in the level of 100 meters. Therefore, the performance of the previous patent can only be used to evaluate the low accurate fully coupled positioning systems.

SUMMARY OF THE PRESENT INVENTION

An objective of the present invention is that, in addition to using the Kalman filter to estimate a stand-alone receiver position, the differential GPS simulation (based on two receivers) is employed as one of the features, so as to not only increase the domain in applications (either one receiver or two receivers) but also provide the evaluation of the fully coupled positioning system for high accuracy positioning.

Another objective of the present invention is to apply the differential GPS positioning to the fully coupled positioning system in order to test the reliability of the system for high accuracy positioning. Using the simulated reference and rover data and giving the position of the reference site, the rover position is estimated in the differential filter which comprises a plurality of Kalman filters running in parallel. The input data of the differential filter are the simulated phase measurements (reference and rover).

Another objective of the present invention is to provide reliable real-time simulated dynamic GPS and inertial (accelerometer and gyro) measurements and then to evaluate the fully coupled positioning system with a low budget and time/labor savings. Using simulated GPS and inertial measurements, the evaluation of the on-board fully coupled positioning system can be performed in the laboratory without a field experiment. Therefore, the cost of the field experiment can be saved especially for an actual-fly test, and at the same time time/labor of preparation for the field experiment can be saved.

Another objective of the present invention is that in addition to simulated rover positions which are the output of the 6DOF trajectory generator, the reference position is also simulated based on the 6DOF trajectory data. Thus, based on the real-time GPS satellite constellation simulation, IF signal generation, SA simulation, GPS receiver tracking loop simulation, receiver (reference or rover) position, and the GPS and receiver models, the corresponding real-time measurement data (pseudoranges, phases, and Doppler shifts) are generated synchronously for both reference and rover sites.

Another objective of the present invention is that based on the gyro and accelerometer measurement and error models and the 6DOF trajectory data, the IMU simulation method generates the dynamic inertial measurements without field experiments synchronously with the GPS simulated measurements.

Another objective of the present invention is that the 6DOF trajectory data can be replaced with real mission trajectories. As a result, the fully coupled positioning system can be evaluated using different cases (trajectories). In other words, the fully coupled positioning system can experience a serial of dynamic tests without limit.

Another objective of the present invention is to support the development, debugging, and final integration of the fully coupled positioning system. Therefore, the final fully coupled positioning system will work properly in applications. Thus, the present invention focuses its attention on a method to validate the gyro, accelerometer, and global positioning system coupled simulation.

Another objective of the present invention is to comprise at least one computer used as computing platforms for the coupled positioning system simulation. For the one-computer case, the computer simulates the GPS and inertial (gyro and accelerometer) in the serial mode. For the two-computers case, one is for the GPS simulation and the other is for the gyro and accelerometer simulation execution simultaneously. Moreover, several RS-232 serial ports are used to output the simulated GPS and inertial measurement data.

DETAILED DESCRIPTION OF THE PREFERRED EMBODIMENT

Figure 1:
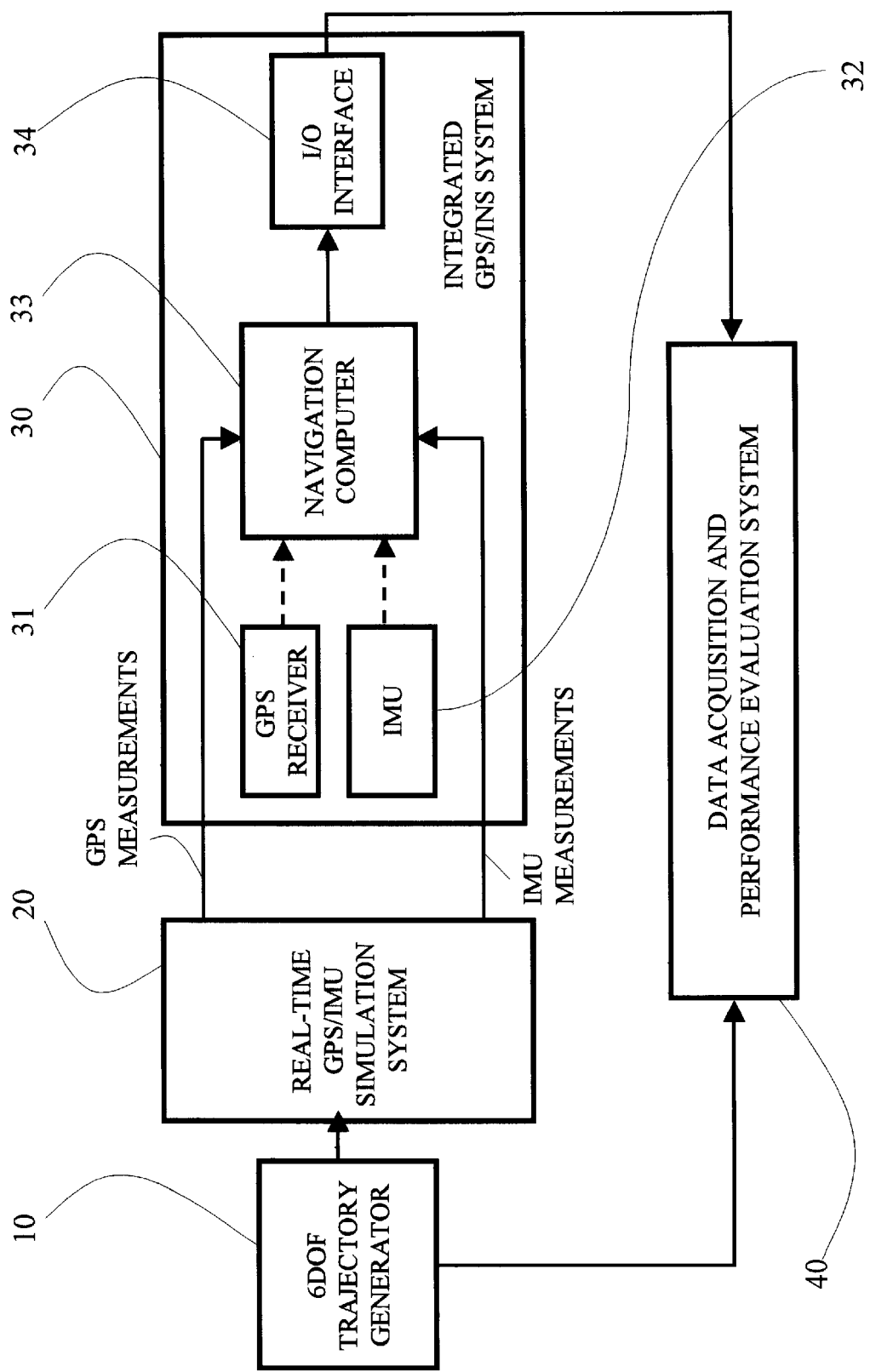
FIG. 1 is a block diagram illustrating a coupled real-time GPSR/inertial sensor simulation system equipped with a 6DOF trajectory generator, a test analysis system, and a fully-coupled positioning system according to a preferred embodiment of the present invention.

The present invention can substantially solve the problems related with the coupled differential (global positioning system/inertia measurement unit) GPS/IMU simulation for dynamic hardware-in-the-loop test of navigation on the ground or in laboratory. The technique involves IMU modeling, IMU error modeling, GPS receiver modeling, dual-frequency modeling, differential GPS modeling, kinematic integer ambiguity resolution, GPS error modeling, and simulated data formatting. During the hardware-in-the-loop test, a 6DOF trajectory generator drives the present system to produce dynamic IMU and GPS measurements. Then, these simulated data and signals are injected into the integrated GPS/INS system. The advantages of the technique applied in the present invention include:

1. Simulating dynamic IMU measurements in real-time using software;
2. Simulating the behavior of a GPS receiver in a dynamic and jamming environment using software;
3. Simulating the GPS and IMU simultaneously using a synchronization technique;
4. Simulating the differential GPS to evaluate the GPS/INS system for high accuracy positioning applications.
5. Having unlimited dynamic IMU sensors and GPS receiver simulation capability coupled with a 6DOF generator; and
6. Providing a cost-effective test method for the GPS/INS system and its cost of maintenance is low.

In order to perform dynamic tests of an integrated GPS/INS navigation system on the ground, the present invention provides a process and system of coupled real-time IMU and GPS simulation with differential GPS, which excites the integrated GPS/INS system on-board the vehicle and makes it possible to predict and evaluate the dynamic performance of the GPS/INS navigation system through replacement of the IMU and the GPS receiver by the coupled GPS/IMU simulation system. The present method increases the safety level of the follow on real flight test and reduces the numbers of flight tests, and eventually, the test cost.

Although the invention will hereinafter be described specifically for test of a GPS/INS navigation system, it is to be understood that alternative aspects thereof are useful for other inertial sensor simulations.

The present invention is based on advanced real-time simulation, computation, and electronic technologies. A GPS model, a differential GPS model, and an IMU model are embedded in a host computer. The GPS model comprises a signal generator and two GPS receiver models. The signal generator is used to mimic the received intermediate frequency GPS signals. One GPS receiver model is a simplified model without tracking loop simulation while another GPS receiver model is a detailed model with models of correlators in a tracking loop. Either one has capability for GPS receiver dynamic performance simulation and jamming resistance performance simulation.

The differential GPS model provides a method for on-the-fly integer ambiguity resolution in where GPS measurements from two GPS receivers are required, wherein one GPS receiver is installed on a motion vehicle and called "rover GPS receiver" and another GPS receiver is installed on a station whose location is known and called "reference GPS receiver" or "reference station". These rover and reference GPS receivers are simulated in the present invention to provide capability for test of differential GPS/IMU navigation system. The IMU model comprises a gyro model and an accelerometer model, and a group of gyro and accelerometer error models.

The synchronization is one key problem in the coupled real-time GPS/IMU simulation system of the present invention, which is obtained by the coupled simulation method in this patent. For the case of using one computer to simulate GPS and IMU, the synchronization is realized by the 6DOF triggering and a timing module for data output. The real-time trajectory data from a 6DOF generator drive the GPS simulation module as well as the IMU simulation module at the same time. This means that the same trajectory data corresponding to one epoch are used to calculate the GPS measurements according to the GPS satellite constellation model and the GPS receiver model and to calculate the IMU measurements according to the IMU measurement models and error models, i.e. the gyro model, the accelerometer model, and their error models, although the simulated GPS measurement data and IMU data will be computed separately by using only one computer.

Figure 2:
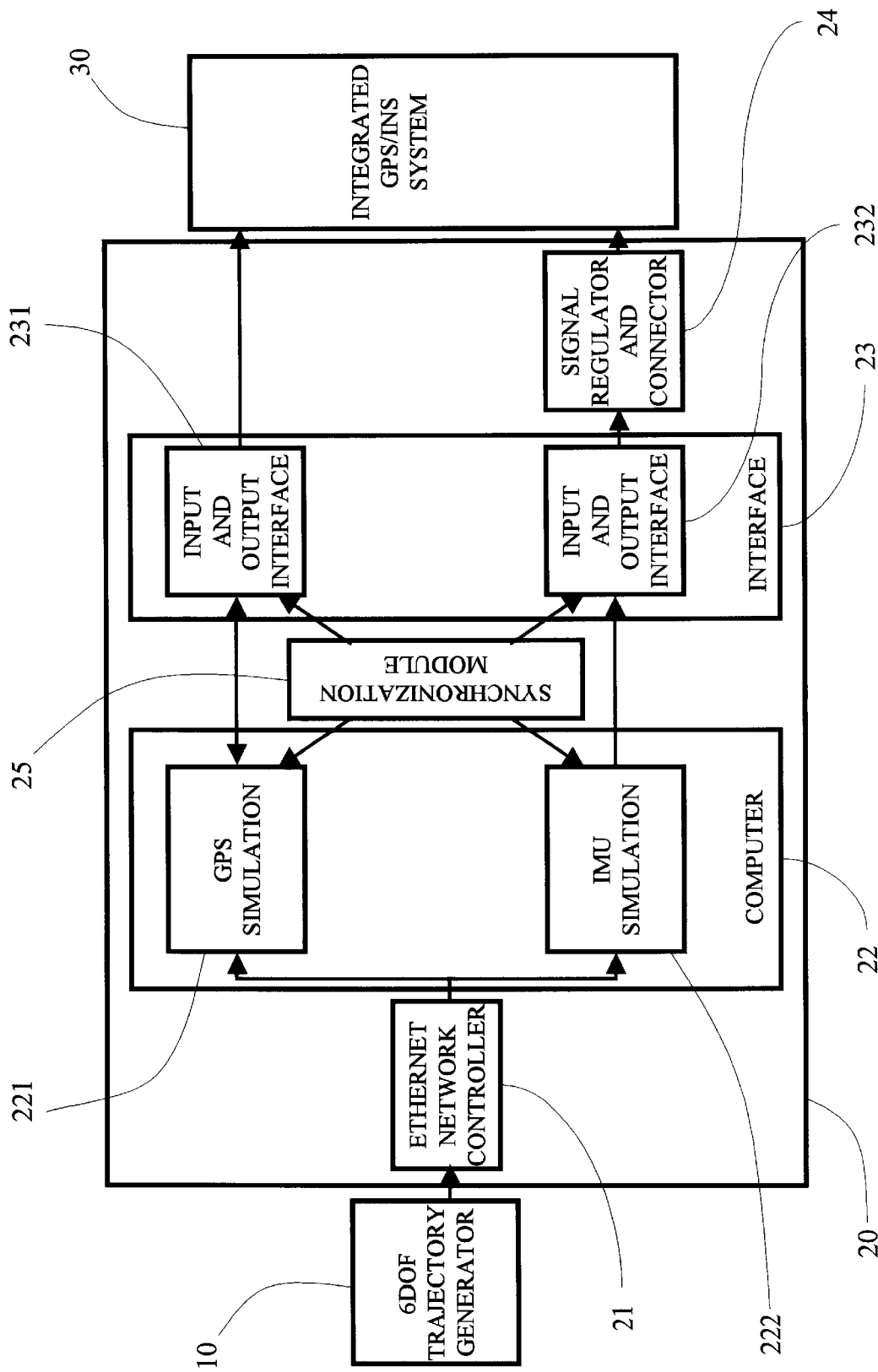
FIG. 2 is a block diagram of a coupled real-time GPSR/inertial sensor simulation method according to the above preferred embodiment of the present invention.

The computer can calculate the IMU data first, or calculate the GPS measurement data first. Each way is acceptable for the coupled real-time simulation method of the present invention. Whatever is calculated first must wait for the second simulated data, the IMU data or the GPS measurement data. A timing software module regulates the output of the simulated IMU data and GPS measurement data in a synchronized fashion. Referring to FIG. 2, the simulated GPS measurement data will be sent out through a GPS input and output interface 231, and the simulated IMU data will be sent out through an IMU input and output interface 232. The simulated IMU data and GPS measurement data will be stored in the buffer to wait the triggering signal. The triggering signal is provided by the computer clock or comes from an outside synchronization signal. At the triggering time, the simulated GPS measurement data and IMU data are sent out synchronously.

So, the coupled GPS and IMU simulation method of the present invention, which utilizes one computer, is to calculate GPS measurements and IMU data using the same trajectory data at different times in a serial fashion, and output these simulated data at the same time.

The real-time GPS/IMU simulation can also be realized by two computers, one is used for GPS simulation, and another one is used for IMU simulation. The synchronization is also one key problem in the coupled real-time GPS/IMU simulation system using two computers which can also be obtained by the coupled simulation method in the present invention. For the case of using two computers to simulate the GPS and IMU, the real-time trajectory data from one 6DOF generator drives both computers to simulate GPS measurements and IMU data at the same time. This means that the same trajectory data corresponding to one epoch are used by the two computers to calculate the GPS measurements according to the GPS satellite constellation model and the GPS receiver model and to calculate the IMU measurements according to the IMU measurement models and error models, i.e. the gyro model, the accelerometer model, and their error models at the same time.

The simulation of GPS and IMU may not be completed at the same time. Whichever is calculated first, it must wait for the second simulated data, the IMU data or the GPS measurement data. Also, a timing software module regulates the output of the simulated IMU data and GPS measurement data in a synchronized fashion. As shown in FIG. 2, the simulated GPS measurement data also will be sent out through the GPS Input and Output Interface 231, and the simulated IMU data will also be sent out through the IMU Input and Output Interface 232. The simulated IMU data and GPS measurement data will be stored in the buffer to wait the triggering signal. However, the triggering signal is provided by the one of the two computers' clock or comes from an outside common synchronization signal. At the triggering time, the simulated GPS measurement data and IMU data are sent out synchronously.

So, the GPS and IMU coupled simulation method, which utilizes two computers, is to calculate GPS measurements and IMU data using the same trajectory data separately on different computers at the same time, and output these simulated data at the same time.

Some test facilities provide an IRIG B time generator. In this case, the simulated GPS measurement data and IMU data are stamped with IRIG time as they are transmitted. The use of the IRIG B time generator facilitates synchronization of all the computers involved in a large test and simulation scenario.

To process the coupled real-time (GPS/IMU) simulation method for positioning and location system of the present invention, as shown in FIG. 1, a 6DOF trajectory generator 10 is connected to a coupled real-time GPS/IMU simulation system 20. The outputs of the real-time GPS/IMU simulation system 20 are directly injected into an integrated GPS/INS system 30 through bypassing a real GPS receiver 31 and a real IMU device 32 in the integrated GPS/INS system 30.

According to the present invention, the process of the coupled real-time (GPS/IMU) simulation with differential GPS comprises the following steps:

1. Input IMU measurement models and IMU error models into the coupled real-time GPS/IMU simulation system 20 according to the real IMU device 32 of the integrated GPS/INS system 30 to be tested. The IMU measurement models comprise gyro measurement model and accelerometer measurement model, which are determined by inertial sensor principles. The IMU error models comprise the gyro error model and accelerometer error model which are defined by a user according to the real IMU device 32 used in the integrated GPS/INS system 30 to be tested.

2. Produce real-time-trajectory data from the 6DOF trajectory generator 10 and send the real-time trajectory data to the coupled real-time GPS/IMU simulation system 20. The coupled real-time GPS/IMU simulation system 20 produces dynamic GPS rover receiver measurements and IMU signals as if a vehicle is really moving along a trajectory defined by the user, and generates reference GPS receiver measurements where the location of the reference GPS receiver is also defined by the user.

Figure 7:
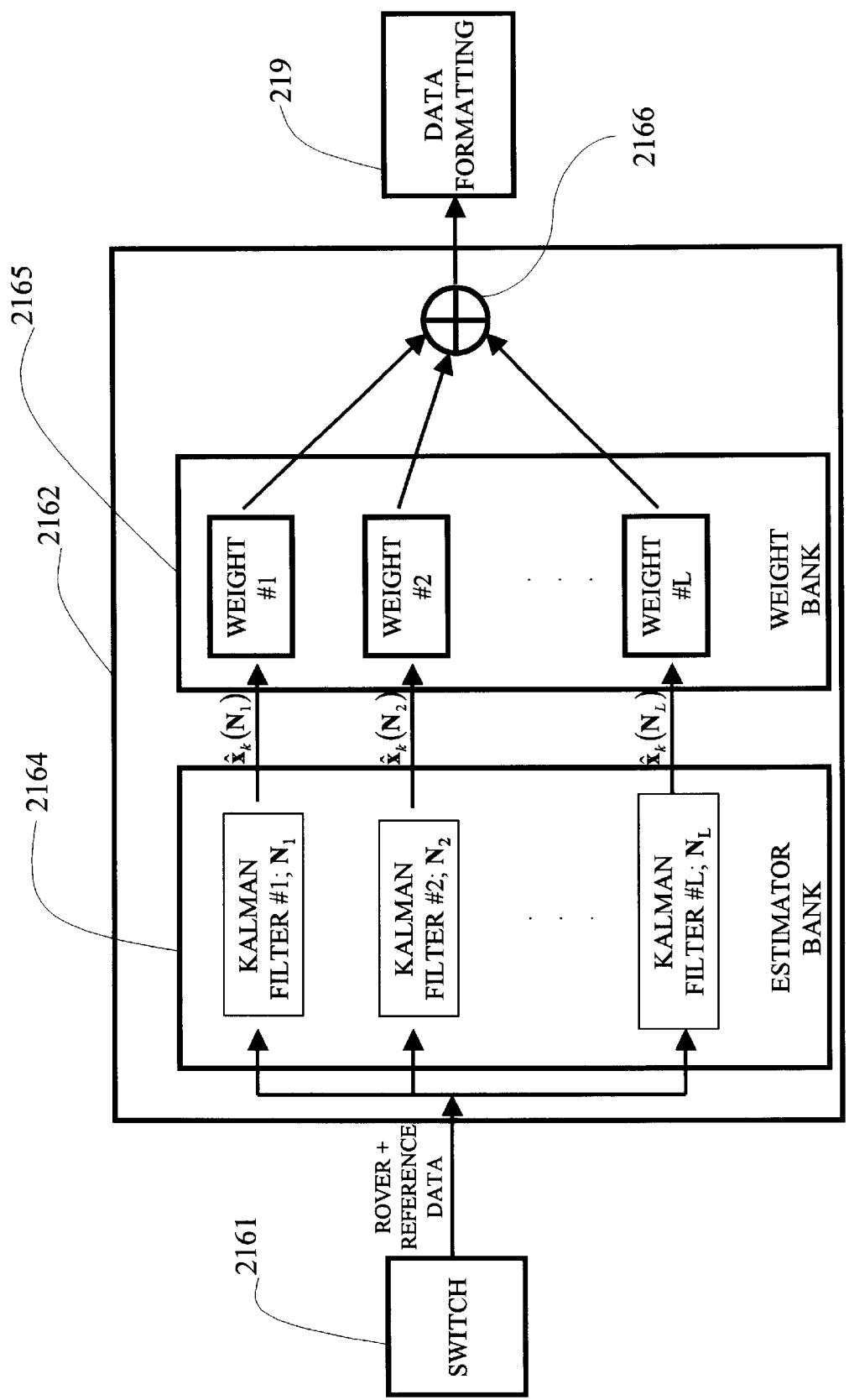
FIG. 7 is a block diagram of a real-time global positioning system differential filter according to the above preferred embodiment of the present invention.

3. Estimate the rover positions by using a differential filter 2162 in an estimator 216 in a differential GPS simulation module 221, wherein input of the estimator 216 is raw data from a rover GPS receiver 2171 and a reference GPS receiver 2172. As shown in FIG. 7, a plurality of Kalman filters 2164-1 to 2164-L is running in parallel in an estimator bank 2164. Each Kalman filter has its own GPS carrier phase integer ambiguity set N. The total sum of the weights (1,2, . . . , L) in a weight bank 2165 is equal to 1. How we choose L and $N_i$ (i=1,2, . . . , L) in the estimator bank 2164 is the crucial factor for real-time applications. The larger the size of the estimator bank, the more computation time is needed. Therefore, the present invention provides a new process to construct the differential filter 2162 from null to full form (referred to FIG. 7).

4. Generate output data including real-time IMU data, identical to the real IMU device in a designed mission, by the IMU model of the coupled real-time GPS/IMU simulation system 20, the simulated GPS measurement data (reference and rover) by the GPS simulation module 221, i.e. the GPS receiver model, in the real-time GPS/IMU simulation system 20, and the rover position and velocity by the estimator 216 in the real-time GPS/IMU simulation system 20.

5. Format the simulated GPS measurement data (including the position and velocity information), and convert the real-time IMU data into IMU simulated electronic signals by an IMU signal generator 23 in the coupled real-time GPS/IMU simulation system 20. The IMU signal generator 23 is in fact an interface board in a simulation computer provided in the coupled real-time GPS/IMU simulation system 20. The IMU signal generator 23 produces the IMU simulated electronic signals that are identical to those produced by the real IMU device 32 in the integrated GPS/INS system 30.

6. Process the simulated GPS measurement data and generated IMU simulated electronic signals by the interface board 23 and a signal regulator and connector board 24 to form electrical specifications and connector pin arrangement which are compatible to the integrated GPS/INS system 30.

7. Inject the simulated GPS measurement data and the IMU simulated electronic signals into the integrated GPS/INS system 30. When the integrated GPS/INS system 30 is excited in dynamic operation, the performance and reliability of the system can be. evaluated as if experiencing a real transportation/flight test.

8. Collect test data from the integrated GPS/INS system 30 during the test. The test data are input to a data acquisition and performance evaluation system 40 which includes a computer, as shown in FIG. 1. Usually, the performance of the integrated GPS/INS system 30 is evaluated by means of the comparison between the reference 6DOF trajectory data and the integrated GPS/INS estimated vehicle trajectory data.

For GPS measurements, the double difference equations for L1 and L1 frequencies are (scalar equations)

$$P^{ij}_{k_{mr}} = \rho^{ij}_{mr} + \rho^{ij}_{c_{mr}} + \frac{I^{ij}_{mr}}{f_k^2} + T^{ij}_{mr} + d^{ij}_{pc_{k_{mr}}} + M^{ij}_{P_{k_{mr}}} + \varepsilon^{ij}_{P_{k_{mr}}}$$

$$\Phi^{ij}_{k_{mr}} = \rho^{ij}_{mr} + \rho^{ij}_{c_{mr}} + \lambda_k N^{ij}_{k_{mr}} - \frac{I^{ij}_{mr}}{f_k^2} + T^{ij}_{mr} + d^{ij}_{pc_{k_{mr}}} + M^{ij}_{\Phi_{k_{mr}}} + \varepsilon^{ij}_{\Phi_{k_{mr}}},$$

$(k = 1, 2)$ where $(\cdot)^{ij}_{mr}$ means double difference which is formed by $(\cdot)^i_m - (\cdot)^j_m - (\cdot)^i_r + (\cdot)^j_r.$ The subscripts m and r denote two (reference and rover) receivers and the superscripts i and j represent two different GPS satellites. P and Φ are the pseudorange and phase range measurements respectively. ρ is the geometric distance between the phase centers of two antennas (a GPS user's receiver and a GPS satellite) at the nominal time and $\rho_c$ refers to the correction of nominal geometrical distance. λ represents wavelength.

$N^{ij}_{mr}$ is the double difference integer ambiguity.

$\frac{I^{ij}_{mr}}{f_k^2}$ is the double difference residual of the ionospheric effect for L1 or L2 frequency and $T^{ij}_{mr}$ denotes the double difference residual of the tropospheric effect.

$d^{ij}_{pc_{(\cdot)_{mr}}}$ refers as the double difference residuals of phase center variations.

$M^{ij}_{(\cdot)_{mr}}$ denotes the double difference residuals of multipath effect. The definitions of the wide lane and narrow lane phase range measurements are $$\Phi^{ij}_{w_{mr}} = \frac{f_1}{f_1 - f_2}\Phi^{ij}_{1_{mr}} - \frac{f_2}{f_1 - f_2}\Phi^{ij}_{2_{mr}}$$

$$\Phi^{ij}_{n_{mr}} = \frac{f_1}{f_1 + f_2}\Phi^{ij}_{1_{mr}} + \frac{f_2}{f_1 + f_2}\Phi^{ij}_{2_{mr}},$$

respectively, and the corresponding integer ambiguities are $$N^{ij}_{w_{mr}} = N^{ij}_{1_{mr}} - N^{ij}_{2_{mr}}$$

$$N^{ij}_{n_{mr}} = N^{ij}_{1_{mr}} + N^{ij}_{2_{mr}},$$

respectively. Therefore, the frequencies for the wide land and narrow lane ambiguities are equal to $f_w = f_1 - f_2$ and $f_n = f_1 + f_2$ respectively. Linearly combining the L1 and L2 equations and using $t_k$ to represent time at epoch k, the sequentially averaged approximated double difference wide lane ambiguity (real number) is expressed as $$\bar{N}^{ij}_{w_{mr}}(t_k) = \frac{\sum_{i=1}^{k} \tilde{N}^{ij}_{w_{mr}}(t_i)}{k} = \frac{(k-1)\bar{N}^{ij}_{w_{mr}}(t_{k-1}) + \tilde{N}^{ij}_{w_{mr}}(t_k)}{k} \quad (1)$$

and the approximated double difference narrow lane ambiguity (real number) is given by $$\tilde{N}^{ij}_{n_{mr}} \approx \left(\lambda_w N^{ij}_{w_{mr}} - \Phi^{ij}_{IS_{mr}} + d^{ij}_{pc_{w_{mr}}} - d^{ij}_{pc_{n_{mr}}}\right)/\lambda_n, \quad (2)$$

where $$\tilde{N}_{w_{mr}}^{ij} \approx (\Phi_{w_{mr}}^{ij} - P_{n_{mr}}^{ij} - d_{pc_{w_{mr}}}^{ij} + d_{pc_{n_{mr}}}^{ij})/\lambda_w,$$

$$\Phi_{IS_{mr}}^{ij}(t_k) = \frac{\sum_{i=1}^{k} \Phi_{IS_{mr}}^{ij}(t_i)}{k} = \frac{(k-1)\bar{\Phi}_{IS_{mr}}^{ij}(t_{k-1}) + \Phi_{IS_{mr}}^{ij}(t_k)}{k},$$

$$\Phi_{IS_{mr}}^{ij} = \Phi_{w_{mr}}^{ij} - \Phi_{n_{mr}}^{ij}$$

denotes the ionospheric signal observation, $$P_{n_{mr}}^{ij} = \frac{f_1}{f_1+f_2} P_{1_{mr}}^{ij} = \frac{f_2}{f_1+f_2} P_{2_{mr}}^{ij},$$

$$d_{pc_{w_{mr}}}^{ij} = \frac{f_1}{f_1-f_2} d_{pc_{1_{mr}}}^{ij} - \frac{f_2}{f_1-f_2} d_{pc_{2_{mr}}}^{ij},$$

and $$d_{pc_{n_{mr}}}^{ij} = \frac{f_1}{f_1+f_2} d_{pc_{1_{mr}}}^{ij} + \frac{f_2}{f_1+f_2} d_{pc_{2_{mr}}}^{ij}.$$

and $\lambda_n$ refer to the wavelengths of the wide lane and narrow lane ambiguities, respectively. Also, the ionosphere-free models for pseudorange and phase range are defined as $$P_{IF_{mr}}^{ij} - \frac{f_1^2}{f_1^2-f_2^2} P_{1_{mr}}^{ij} - \frac{f_2^2}{f_1^2-f_2^2} P_{2_{mr}}^{ij}$$

$$\Phi_{IF_{mr}}^{ij} - \frac{f_1^2}{f_1^2-f_2^2} \Phi_{1_{mr}}^{ij} - \frac{f_2^2}{f_1^2-f_2^2} P_{2_{mr}}^{ij},$$

respectively.

Figure 3:
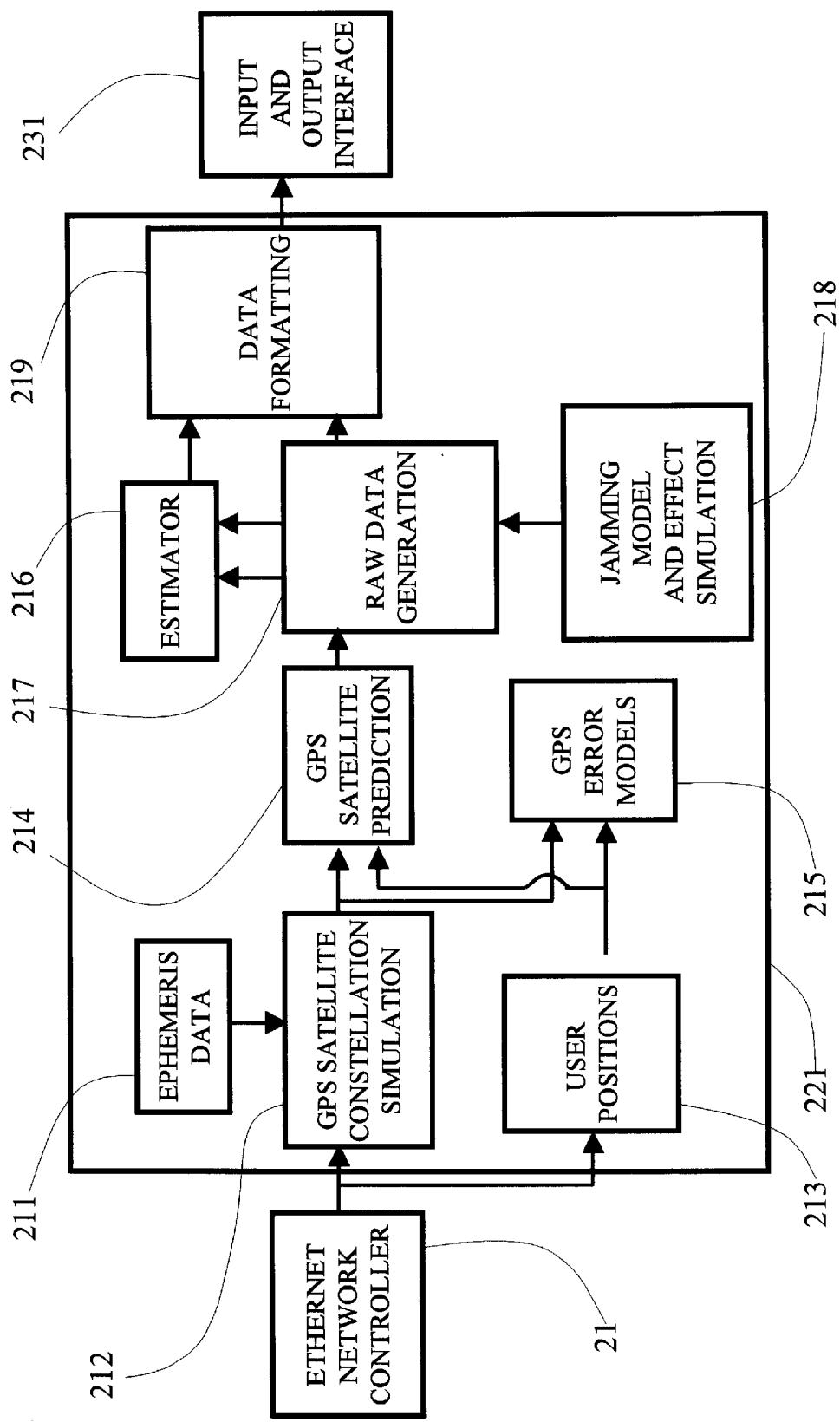
FIG. 3 is a block diagram of a real-time global positioning system simulation method with a simplified model according to the above preferred embodiment of the present invention.
Figure 5:
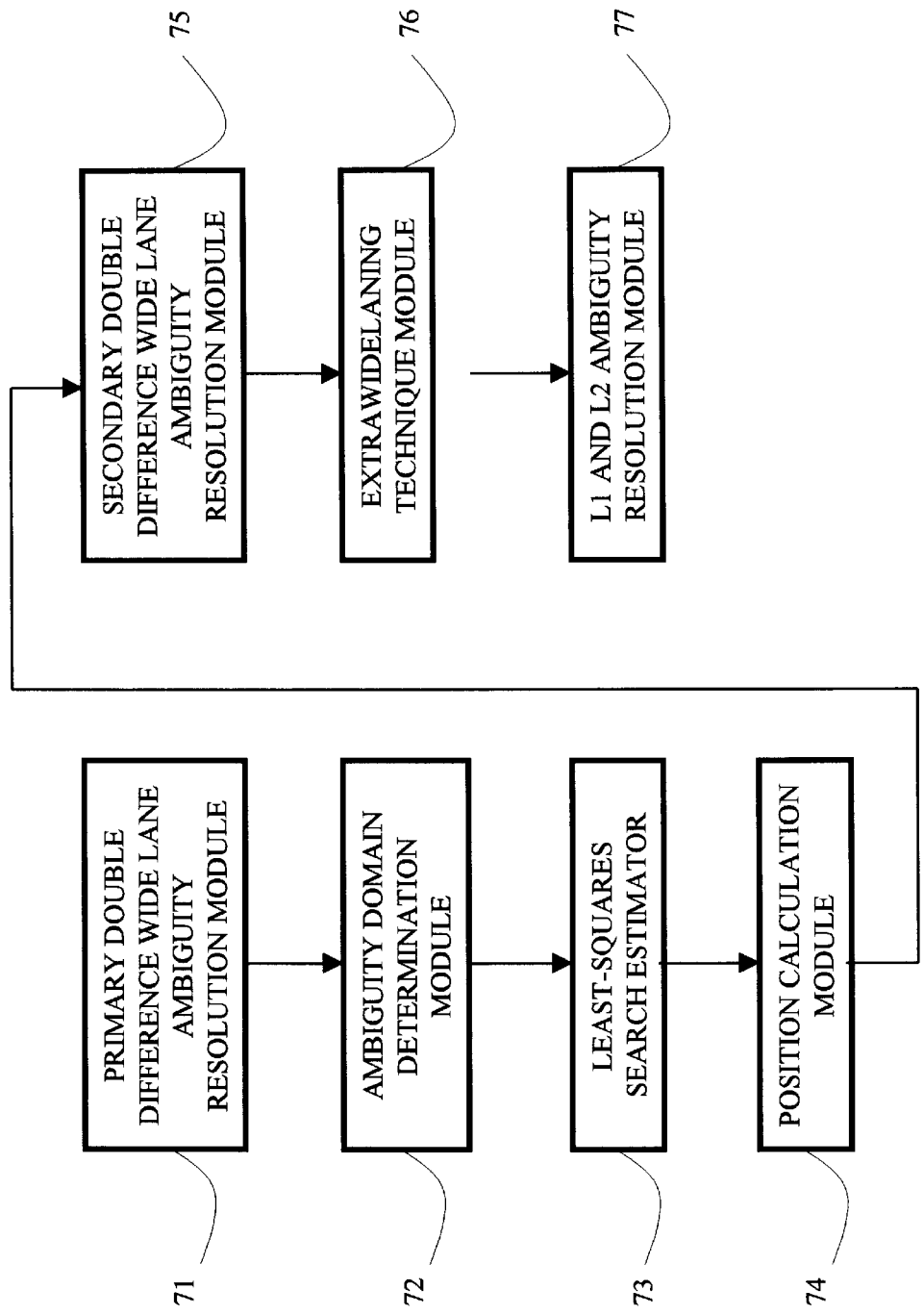
FIG. 5 is a flow chart of intermediate ambiguity search strategy (IASS) according to the real-time global positioning system estimation method (on-the-fly technique (OTF)) according to the above preferred embodiment of the present invention.

In step 3, as shown in FIG. 3, the differential filter 2162 is contributed by the estimator bank 2164 and the corresponding weight bank 2165, an intermediate ambiguity search strategy. (IASS), and a search window, which contains several time epochs. Basically, IASS includes a "simplified" least-squares method and an extrawidelaning technique, as shown in FIG. 5. Before using the least-squares method to search the ambiguities, observable common satellites between two antennas (reference and rover) are divided into two groups: primary satellites and secondary satellites. Since double difference equations are used, the satellite with the highest elevation is defined as a reference satellite. The primary satellites include the next four higher elevation satellites, i.e., there are four independent double difference equations. The rest of the observable satellites are categorized into the secondary satellites.

As shown in FIG. 5, the IASS process comprises a primary double difference wide lane ambiguity resolution module 71, an ambiguity domain determination module 72, a least-squares search estimator 73, a position calculation module 74, a secondary double difference wide lane ambiguity resolution module 75, an extrawidelaning technique module 76, and a L1 and L2 ambiguity resolution module 77. The first step of the IASS is to resolve the primary double difference wide lane ambiguities in the primary double difference wide lane ambiguity resolution module 71. The a priori information about rover position (obtained from ionosphere-free pseudorange measurements) and approximated double difference wide lane ambiguities (Equation (1)) are combined with primary double difference wide lane phase measurements to estimate the rover position and primary double difference wide lane ambiguities.

After the estimation of the primary double difference wide lane ambiguities, the estimated primary double difference wide lane ambiguities and corresponding cofactor matrix are sent to the ambiguity domain determination module 72, wherein an ambiguity search domain is established based on the estimated double difference wide lane ambiguities and the corresponding cofactor matrix. The ambiguity search domain is sent to the least-squares search estimator 73. A standard least-squares search method is applied to search the integer ambiguity set in the least-squares search estimator 73. Also, the standard least-squares search method can be simplified to accelerate the ambiguity search. The "simplified" least-squares search method is defined as directly searching the integer ambiguity set, that minimizes the quadratic form of residuals $$R_i = (\hat{x}_N - n_i)^T P_{\hat{x}_N}^{-1} (\hat{x}_N - n_i)$$

where $\hat{x}_N$ is the optimal estimate vector of the double difference wide lane ambiguities (real number), $n_i$ is the double difference wide lane ambiguity vector within the search domain (integer number), and $P_{\hat{x}N}$ is the cofactor matrix corresponding to the optimal double difference wide lane ambiguity estimate, without using statistical or empirical tests (because the estimator bank 2164 and the respective weight bank 2165 will execute the task of confirmation).

Fixed primary double difference wide lane ambiguities are sent to the position calculation module 74 to compute the rover position. The calculated rover position is sent to the secondary double difference wide lane ambiguity resolution module 75 to fix secondary double difference wide lane ambiguities by applying the primary wide-lane-ambiguity-fixed rover position solution into the secondary double difference wide lane phase measurements.

Substituting the resolved double difference wide lane ambiguities into Equation (2), approximated double difference narrow lane ambiguities (real numbers) are calculated. The extrawidelaning technique states that if the double difference wide lane ambiguity is even (or odd), the corresponding double difference narrow lane ambiguity is even (or odd), and vice versa. Using the extrawidelaning technique, the double difference narrow lane ambiguities can be resolved in the extrawidelaning technique module 76. Therefore, in the L1 and L2 ambiguity resolution module 77, the L1 and L2 ambiguities are calculated from the combination of the double difference wide lane ambiguities and double difference narrow lane ambiguities, which correspond to $$N_{1_{mr}}^{ij} = \frac{N_{w_{mr}}^{ij} + N_{n_{mr}}^{ij}}{2}$$

and $$N_{2_{mr}}^{ij} = \frac{N_{n_{mr}}^{ij} - N_{w_{mr}}^{ij}}{2},$$

respectively.

Therefore, step 3 can further divided into the following steps:

(3.1) Set up a search window which comprises a plurality of time epochs (assumed N epochs).

(3.2) Search an integer ambiguity set at the first time epoch of the search window by using the IASS. The integer ambiguity set becomes a member of the estimator bank 2164 because there is no member in the estimator bank 2164 before the first time epoch. Based on the integer ambiguity set and phase measurements, the rover position (ambiguity-fixed solution) is estimated in the estimator bank 2164, and then a corresponding weight is calculated in the weight bank 2165, as shown in FIG. 7. The calculation of the weight is according to $$p_m(N_i \mid \Delta\Phi_k^*) = \frac{p_m(\Delta\Phi_k^* \mid N_i)}{\sum_{j=1}^{L} p_m(\Delta\Phi_k^* \mid N_j)}, \quad i = 1, 2, \ldots, L \quad (3)$$

where $$p_m(\Delta\Phi_k^* \mid N_i) p_m(\Delta\Phi_k \mid \Delta\Phi_{k-1}, \Delta\Phi_{k-2}, \ldots, \Delta\Phi_1, N_i) p_m(\Delta\Phi_{k-1}^* \mid N_i),$$
$$i=1,2,\ldots,L \quad (4)$$

and the first term of the product can be expressed as $$p_m(\Delta\Phi_k \mid \Delta\Phi_{k-1}, \Delta\Phi_{k-2}, \ldots \Delta\Phi_1, N_i) =$$
$$\frac{1}{\sqrt{(2\pi)^r det(cov(\Delta\Phi_k))}} \cdot \exp\left(-\frac{\hat{z}_k^T cov(\Delta\Phi_k)^{-1} \hat{z}_k}{2}\right), \quad i = 1, 2, \ldots, L$$

which is assumed and defined as a Gaussian distribution. Equation (4) states the accumulative property of $p_m(\Delta\Phi_k^* \mid N_i)$, where $p_m(\Delta\Phi_k^* \mid N_i)$ represents the probability mass function of the measurement sequence $\Delta\Phi_k^* = \{\Delta\Phi_1, \Delta\Phi_2, \ldots, \Delta\Phi_k\}$ up to the current time $t_k$ conditioned by the individual ambiguity set $N_i$. In other words, the calculation of the weight depends on not only the data of the current time epoch but also the data of the previous time epochs. $det(\cdot)$ and $(\cdot)^{-1}$ denote the determinant and the inverse of a matrix, respectively. $z]_k$ is the optimal measurement residual (measurement value—the optimal computed value) at time $t_k$ and $$cov(\Delta\Phi_k) = E\{\hat{z}_k \hat{z}_k^T\}$$

is the covariance matrix of the measurement at the $t_k$. r is the dimension of the measurement at each epoch. For the first. time epoch $(t_1)$ (k=1) of the search window, Equation (4) (probability) becomes $$p_m(\Delta\Phi_1^* \mid N_i) = \frac{1}{\sqrt{(2\pi)^r det(cov(\Delta\Phi_k))}} \cdot \exp\left(-\frac{\hat{z}_k^T cov(\Delta\Phi_k)^{-1} \hat{z}_k}{2}\right), \quad (5)$$
$$i = 1, 2, \ldots, L.$$

Of course, the value of the only weight (L=1 in Equation (3)) is equal to one. An optimal rover position for this time epoch is equal to the rover position multiplied by the corresponding weight. Based on the optimal rover position and the Doppler shifts, a rover velocity is estimated.

Figure 6:
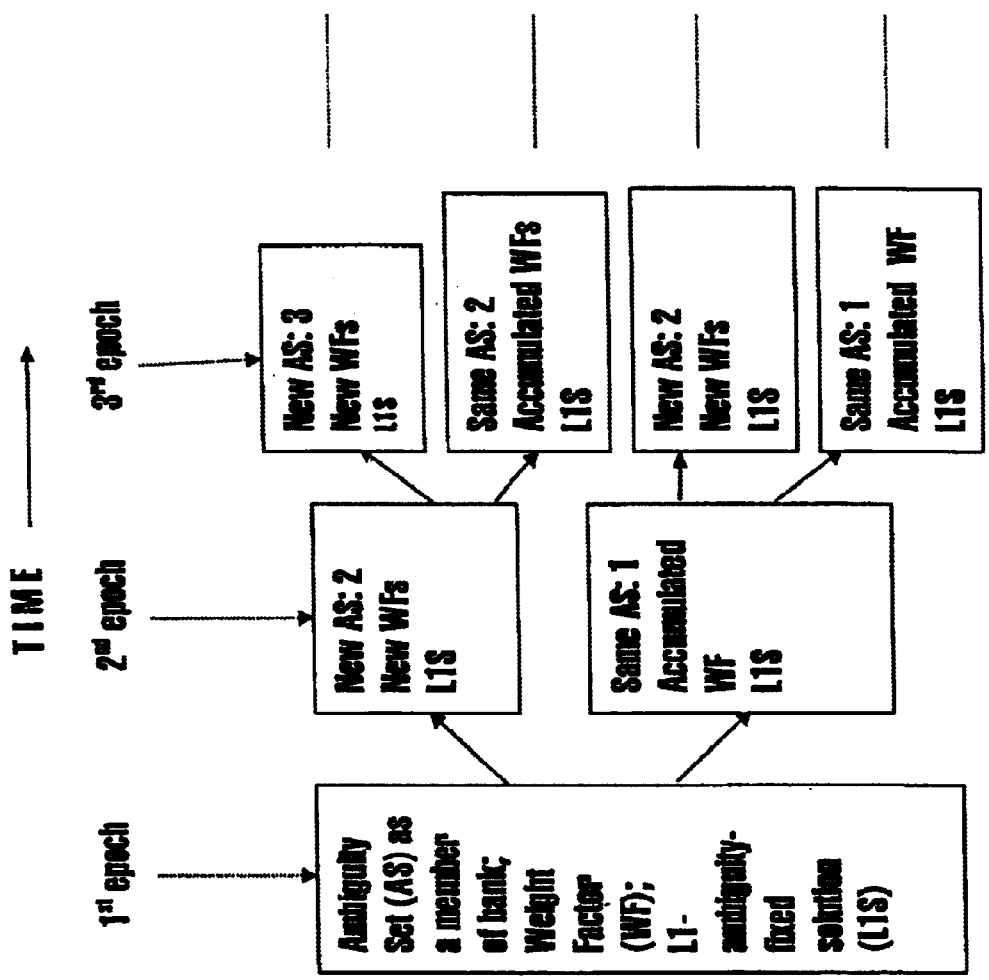
FIG. 6 is a block diagram of the procedure for forming the estimator bank and weight bank according to the real-time global positioning system estimation method according to the above preferred embodiment of the present invention.

(3.3) Follow steps 2 first at the second time epoch of the search window. And, then the IASS is used to search the integer ambiguity set based on the data from the second time epoch. Two situations may occur:

(3.3-1) When the integer ambiguity set is the same as the one of the previous time epoch (the first time epoch), the number of the Kalman filter remains, as shown in the lower part of FIG. 6 for the second time epoch. Based on the integer ambiguity set and the phase measurements (for the second time epoch), the rover position (ambiguity-fixed solution) can be estimated in the estimator bank 2164 and the corresponding weight is accumulatively calculated in the weight bank 2165 (i.e. Equations (3) and (4), where L=1). The optimal rover position is equal to the rover position multiplied by the associated weight (of course, the value of the weight is equal to one). Based on the optimal rover position and the Doppler shifts, the rover velocity is estimated.

(3.3-2) When the integer ambiguity set is different from the one of the previous time epoch (the first time epoch), the current integer ambiguity set becomes a new member of the estimator bank 2164, i.e., the number of the Kalman filters increases by one (i.e. two members), as shown in the upper part of FIG. 6 for the second time epoch. Based on each integer ambiguity set and the same phase measurements (for the second time epoch), an individual rover position (ambiguity-fixed solution) can be estimated in the estimator bank 2164 and the calculation of each corresponding weight is based on Equations (3) and (5) (where L=2) in the weight bank 2165. In other words, when new integer ambiguity set is resolved, each corresponding weight of the weight bank 2165 is recalculated and based on Equations (3) and (5). The optimal rover position for the second time epoch is equal to the sum of the individual rover position multiplied by the associated weight. Based on the optimal rover position and the Doppler shifts, the rover velocity is estimated.

(3.4) Follow the same procedure as described in (3.3) for the rest of the time epochs of the search window. At the last time epoch (the $N^{th}$ time epoch) of the search window, after the search of IASS, the estimator bank 2164 and the corresponding weight bank 2165 are completely established (referred to FIG. 7).

(3.5) Also follow steps 2 first at the $(N+1)^{th}$ time epoch. Still, the phase measurements are input into the differential filter 2162 (each Kalman filter has the same input). Based on each integer ambiguity set and the phase measurements (for the $(N+1)^{th}$ time epoch), the individual rover position (ambiguity-fixed solution) can be estimated in the estimator bank 2164 and each corresponding weight is calculated accumulatively (based on Equations (3) and (4)) in the weight bank 2165. The optimal rover position is equal to the sum of the individual rover position multiplied by the associated weight. Based on the optimal rover position and the Doppler shifts, the rover velocity is estimated.

(3.6) Follow the same procedure as described in (3.5) after the $(N+1)^{th}$ time epoch to identify the integer ambiguity set. The procedure is stopped when a criterion is met. The criterion is defined as $$p_m(\Delta\Phi_k^* \mid N_i) > C$$

where C denotes a very large uncertainty. After the criterion is met, the estimator bank 2164 and the weight bank 2165 stop functioning. During the confirmation period (from the first time epoch of the search window to the time epoch when the estimator bank 2164 and the weight bank 2165 stop functioning), the estimator bank 2164 and the weight bank 2165 continuously identify the correct integer ambiguity set and estimate the rover position in real-time. One important characteristic of the weight bank 2165 is that the weight corresponding to the correct integer ambiguity is approaching to one while the others (corresponding to the rest of integer ambiguity sets) are converging to zero.

Therefore, the correct integer ambiguity set is the one with the weight close to one.

Figure 8:
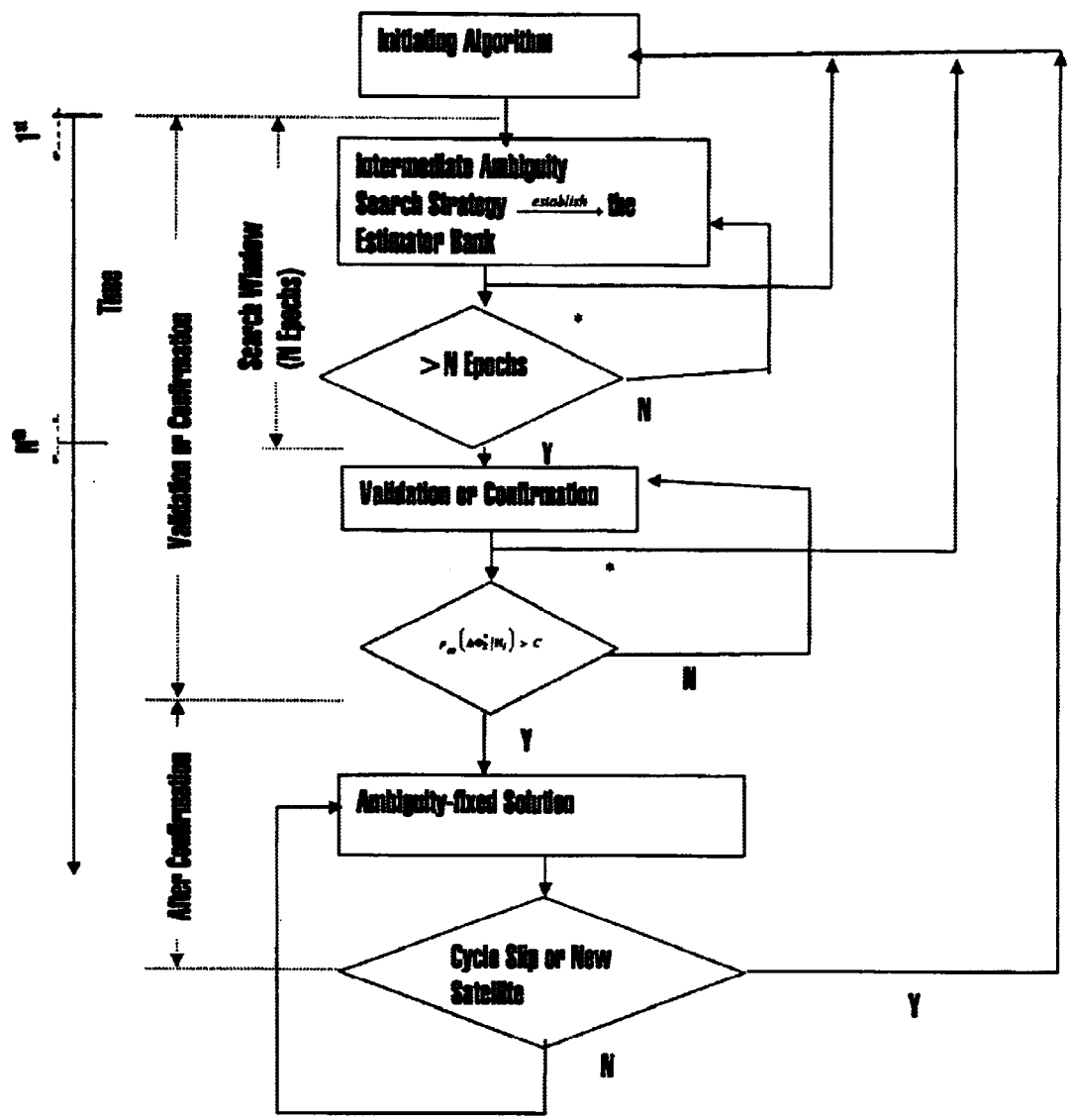
FIG. 8 is a flow chart of the real-time global positioning system estimation method for differential GPS according to the above preferred embodiment of the present invention.

(3.7) Estimate the rover position and velocity by using the least-squares estimated method after fixing the integer ambiguities. As the cycle slips or new visible satellite(s) occur, the algorithm (steps (3.1)–(3.7)) will be reinitiated. FIG. 8 shows the summation of the algorithm.

Referring to FIGS. 1 and 2, the coupled real-time GPS/IMU simulation system 20 connected between a 6DOF trajectory generator 10 and an integrated GPS/INS system 30 for processing the coupled real-time simulation method comprises an Ethernet network controller 21, a simulation computer 22, an interface board 23 (IMU signal generator), a signal regulator and connector board 24, and a synchronization module 25. The simulation computer 22 comprises a GPS simulation module 221 to perform GPS simulation and an IMU simulation module 222 to perform IMU simulation. The interface board 23 includes a GPS simulation input/output interface 231 and an IMU simulation input/output interface 232. The GPS simulation module 221 receives real-time trajectory data from the 6DOF trajectory generator 10 and generates the dynamic GPS measurements including pseudoranges, carrier phases, and Doppler shifts, and positioning information such as location and velocity. Also, based on the real-time trajectory data from the 6DOF trajectory generator 10, the trajectory for a nearby reference object can be simulated and therefore the corresponding simulated GPS measurement data can be calculated. These data are formatted (as well as the ephemeris and even atmospheric parameters) to form the simulated GPS measurement data. The formatted data are sent out through the GPS simulation input/output interface 231 which is a standard RS-232 interface to the integrated GPS/INS system 30. For the tightly-coupled GPS/INS integration system, the velocity information from the integrated GPS/INS system 30 is sent through the same interface to the GPS simulation module. This feedback velocity information can be used for GPS tracking loop aiding to facilitate the tightly-coupled GPS/INS integration system.

The IMU simulation module 222 receives real-time flight data from the 6DOF trajectory generator 10 and produces IMU simulated measurements. The IMU simulation input/output interface 232 projects the IMU measurements into specific simulated electronic signals. The IMU simulated electronic signals, coupled with the simulated GPS measurement data, are injected into the integrated GPS/INS system 30 which causes the on-board GPS/INS navigation computer 33 installed therein (as shown in FIG. 1) into working as if the vehicle is really moving. Accordingly, the coupled real-time (GPS/IMU) simulation method of the present invention is efficiently utilized for ground test of installed GPS/INS navigation systems, laboratory hardware-in-the-loop dynamic simulation, and GNC system analysis and development.

The GPS simulation module 221 comprises a GPS satellite system modeling and a GPS receiver modeling. There are two methods for GPS simulation according to the present invention: (1) a simplified simulation method without GPS signal generation and GPS receiver tracking loop simulation, and (2) a detailed simulation method coupled with GPS signal generation and GPS receiver tracking loop simulation.

The simplified simulation method is illustrated in FIG. 3. The 6DOF trajectory data from the 6DOF trajectory generator 10 triggers a GPS satellite constellation simulation 212. The GPS satellite constellation simulation 212 reads orbit parameters, satellite clock parameters, and atmospheric parameters from ephemeris data 211, which are stored in a GPS/IMU simulation computer. The GPS satellite constellation simulation 212 calculates the position and velocity vector in the Earth-Centered-Earth-Fixed (ECEF) coordinate system for all GPS satellites. The satellite constellation is a function of time and the ephemeris data. The time is also obtained from the 6DOF trajectory generator 10.

As shown in FIG. 3, the rover positions in user positions 213 are given by the 6DOF trajectory data, and the reference positions (moving or stationary) in the user positions 213 are simulated based on the real-time trajectory data. The rover positions are assumed to be the real-time trajectory data and the reference position is simulated nearby the real-time trajectory data from the 6DOF trajectory generator 10. A GPS satellite prediction 214 uses the information from the GPS satellite constellation simulation 212 and the user positions 213 to determine the visible GPS satellites and their elevation, azimuth, and Doppler shifts. GPS error models 215 use the information from the GPS satellite constellation simulation 212 and the user positions 213 to calculate the error correction terms, including the satellite clock correction, relativistic, ionospheric delay, tropospheric delay, and group delay with respect to both of the rover and reference positions.

The effect of the neutral atmosphere (i.e., the nonionized part) is denoted as tropospheric refraction. The neutral atmosphere is a nondispersive medium with respect to radio waves to frequencies up to 15 GHz, and thus the GPS propagation is frequency independent. Consequently, a distinction between carrier phases and code ranges derived from different carriers L1 or L2 is not necessary.

Two parts, known as the wet and dry parts, contribute to the tropospheric delay. Because of unpredictable distribution of water vapor, the wet part is much more difficult to model. Fortunately, the wet part only contributes 10% of the tropospheric delay while the dry part contributes 90% of the tropospheric delay. The tropospheric delay is not only a function of temperature, pressure, and relative humidity (sky weather parameters) along the GPS signal propagating path but also a function of signal direction, particularly the elevation angle of the GPS satellite with respect to the receiver site. In the present invention, the troposphere is described by the modified Marini model, which is a function of the above mentioned factors.

In addition to the above information, the tropospheric delay also depends on the geodetic height and latitude of a GPS antenna. The vehicle's position is provided by the real-time trajectory data. An assumption is made that the position of the GPS antenna is the same as the vehicle's position which would not introduce additional error due to the position deviation, which can be omitted as compared with the distance to the satellite.

The ionosphere, extending in various layers from about 50 Km to 1500 Km above the earth, is a dispersive medium with respect to the GPS radio signal. Usually, the ionospheric delay is given as $$\Delta^{iono} = \frac{40.3}{f^2} TEC$$

where
  f the carrier frequency, L1 or L2;
  TEC the total electron content along the GPS signal path between the GPS receiver and satellite.

As the GPS signals pass through the atmosphere, the ionosphere will delay the code phases but advance the carrier phases in the same magnitude. Therefore, for carrier measurements, the ionospheric delay has the same form as in the previous equation, but with a negative value.

In the present invention, because of the real-time applications, the broadcast ionospheric model (Klobuchar model) is adopted to describe the effect of the ionosphere. The ionospheric delay is calculated from the satellite azimuth, GPS time, vehicle's longitude and latitude, satellite elevation angle, and the satellite transmitted data words $\alpha_n$ and $\beta_n$ (n=0,1,2,3).

Selective Availability (SA) is a conscious degradation of positioning implemented by the Department of Defense (DoD) for unauthorized users. The typical positioning accuracy with SA on is 100 meters. Selective Availability uses a $2^{nd}$ order Gauss-Markov model as specified in RTCA/DO-208.

The effect of SA is simulated as the sums of (1) a second order Gauss-Markov process and (2) a random constant. The second-order Gauss-Markov process is described by the power spectral density:

$$S(\omega) = \frac{c^2}{\omega^4 + \omega_0^4}$$

m²/(rad/sec)
where $c^2$=0.002585 m²

$\omega_0$=0.012 rad/sec

The root-mean-square (RMS) value of the second order Gauss-Markov process is 23 meters and its time constant is 118 seconds. The random constant has a normal distribution with a zero mean and a standard deviation of 23 meters.

A jamming model and effect simulation 218 is used to simulate the impact of jamming on the GPS signal reception. An array of jammers defined by location, type, and effective radiating power is constructed and input to the jamming model and effect simulation 218. The types of jammers include pulsed, continuous wave (CW), and narrowband. The angle of incidence of the jammer signal on the GPS antenna gain pattern is calculated, and the attenuation at the receiver is determined. To analyze the collective effect of the jammer array, it is assumed that the jammer signals add in coherently. The model computes the jammer-to-signal power ratio (J/S) for each transmitter/receiver pair. The J/S ratio is a function of jammer type, jammer radiating power, distance between the transmitter and the receiver, GPS tracking frequency, and receiver antenna gain pattern. The effects of jamming on the GPS receiver 31 (as shown in FIG. 1) vary from complete loss of data to reduce tracking performance and degrade measurement accuracy. The location, type, and effective radiating power of a jammer are determined by the user through an interactive operation.

A raw data generation 217 uses the information from a GPS satellite prediction 214, the GPS error models 215, and the jamming model and effect simulation 218 to calculate the simulated pseudoranges, carrier phases, and Doppler shifts for all visible satellites. The pseudorange data is calculated from the satellite position, receiver positions (reference and rover sites), the ionospheric delay, tropospheric delay, and jamming effect. The carrier phase is calculated from the current and initial distances between the satellite and the vehicle, and initial fractional carrier phase. The satellite clock error is calculated from the satellite clock parameters. The Doppler shift is calculated from the satellite velocity and the receiver (reference or rover) dynamics.

An estimator 216 calculates the rover position and velocity. The position and velocity information and the simulated raw data are formatted by a data formatting 219 along with the ephemeris data according to a specific protocol. GPS receivers from different GPS receiver manufacturers output GPS measurements in different formats. The data formatting is an integral part which allows the simulated GPS measurement data to have a format identical to that of a real GPS receiver used in the GPS/INS navigation system.

Figure 4:
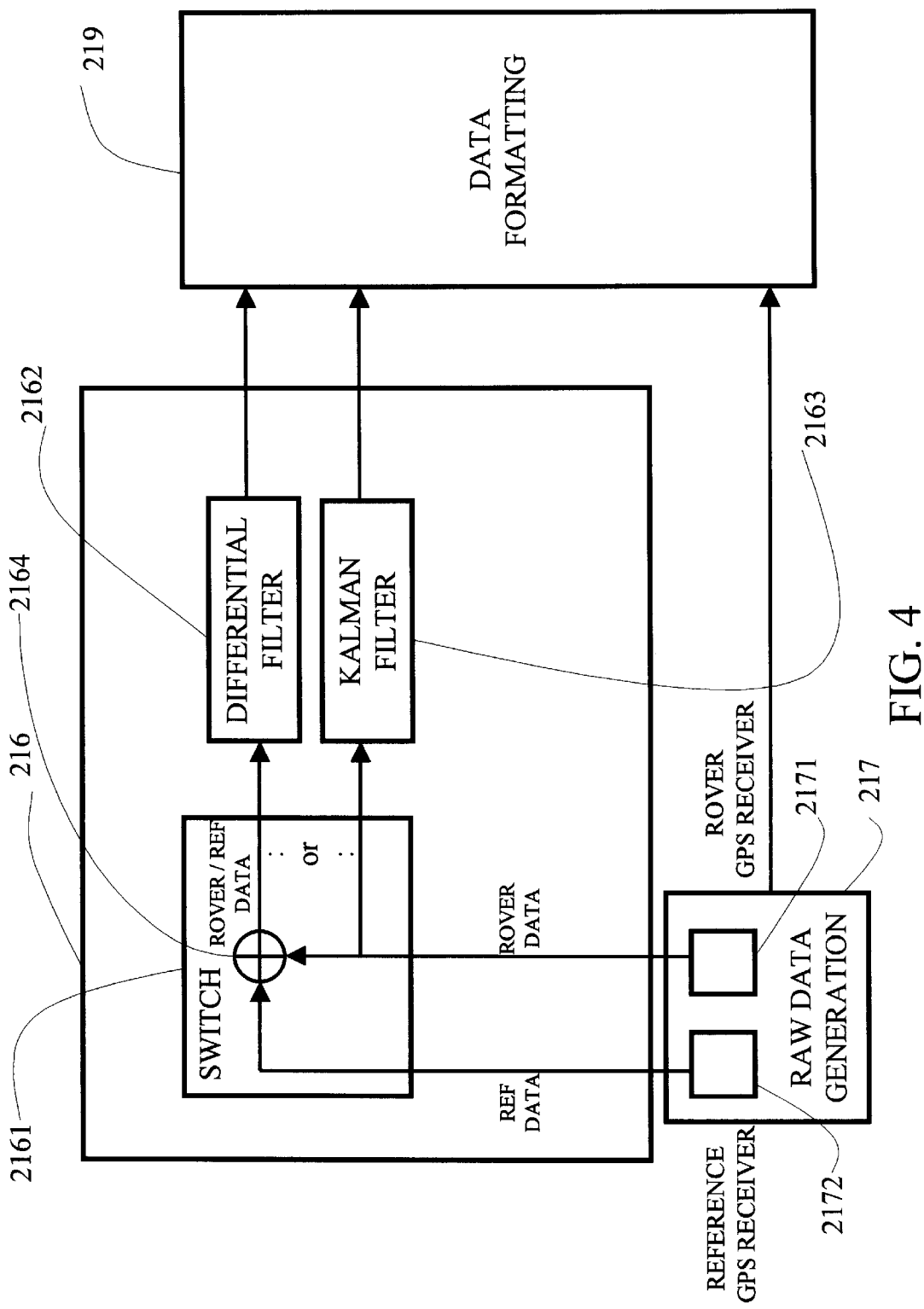
FIG. 4 is a block diagram of the real-time global positioning system estimation method according to the above preferred embodiment of the present invention.

The estimator 216 can perform two types of function. One is to use the Kalman filter 2163 to estimate a stand-alone rover position and velocity using the corresponding rover data and the other function is to use the differential filter 2162 to perform the differential GPS positioning using both reference and rover data, as shown in FIG. 4. When the operation mode is one, a switch 2161 will connect the rover raw data to the Kalman filter 2163. When the operation mode is two, an adder 2164 will combine the rover and reference (ref) raw data, and then the switch 2161 will connect the combined data to the differential filter 2162. Therefore, the output of the estimator 216 is the output of either the differential filter 2162 or the Kalman filter 2163.

The new process used in the differential filter 2162 of the present invention is summarized in FIGS. 5, 6, and 8. FIGS. 5 and 6 show the method to construct the estimator bank 2164 and weight bank 2165 (as shown in FIG. 7), and FIG. 8 is the summary of the present invention used for the differential filter 2162 to resolve the integer ambiguity set on the fly and estimate the rover position in real-time.

In order to increase the robustness of the present invention, the search window is proposed and used as a bridge between the estimator bank and IASS. As mentioned above, the search window comprises a plurality of time epochs. The size of the search window depends on the baseline between both receivers and the quality of the measurement data. Alternatively, the size of the search window can be standardized, i.e. one size fits all cases (different baselines). As shown in FIG. 6, during the search window, IASS is used to search the integer ambiguity set at each epoch, and if the value of the integer ambiguity set is different from the ones for the previous time epochs, the current integer ambiguity set becomes a member of the estimator bank 2164. In other words, the number of members in the estimator bank 2164 is augmenting until the end of the search window. Therefore, for a $30^{th}$ time epoch search window, the number of Kalman filters is at most 30 in the estimator bank 2164. It also means that the estimator bank 2164 has been built from null to full form, which is shown in FIG. 7, during the search window and, at the same time, the integer ambiguity sets are being verified and the rover position and velocity are being estimated. After the period of the search window, no more candidates are added into the estimator bank 2164, and the estimator bank 2164 and the corresponding weight bank 2165 will identify the correct integer ambiguity set and estimate the rover position and velocity as the measurements continuously enter the differential filter 2162.

Referring to FIG. 7, the differential filter 2162 comprises the estimator bank 2164, which has a number of Kalman filters running in parallel, and the weight bank 2165. The input of the estimator bank 2164 is reference and rover measurement data (phase measurements) from the switch 2161 and each Kalman filter has the same input. Each Kalman filter has its own fixed integer ambiguity set ($N_i$, i=1,2, ..., L), where L is a positive integer number denoting the number of filters in the estimator bank 2164. Based on the individual integer ambiguity set and the phase measurements, the rover position ($\hat{x}_k(N_i)$), where k denotes at time epoch k or time $t_k$, is individually estimated and, therefore, the corresponding weight (weight #i, $p_m(N_i|\Delta\Phi^*_k)$) is calculated in the weight bank 2165. The total sum of the weights in the weight bank 2165 is equal to 1. The individual rover position and the corresponding weight are combined at a multiplier. The output of each multiplier is added at an adder 2166 and as a result the output of the adder 2166 is $$\hat{x}_k = \sum_{i=1}^{L} \hat{x}_k(N_i) p_m(N_i \mid \Delta\Phi_k^*),$$

which is the optimal rover position at time epoch k. Based on the optimal rover position and the associated Doppler shifts, the rover velocity can be estimated. One important character of the estimator bank 2164 is that the weight corresponding to the correct integer ambiguity set is approaching one while the others are approaching zero as the measurements involve with time.

The estimator bank 2164 will stop after a criterion is met, i.e., $$p_m(\Delta\Phi^*_k \mid N_i) > C$$

where C essentially represents a very large uncertainty, and the integer ambiguity set will be selected for the one with the value of the weight close to one. After fixing the ambiguities, the rover position is estimated by using a least-squares estimated method and defined as an ambiguity-fixed solution. The summary of the process of the present invention is depicted in FIG. 8. When new satellites or cycle slips occur, the process will be reinitiated. Therefore, the differential filter 2162 refers as the whole procedure of the process from constructing the estimator bank 2164 and the weight bank 2165 to estimating the ambiguity-fixed solution by using the least-squares method and outputs the rover position and velocity to the data formatting 219. During the whole procedure, the new process searches the correct ambiguity set on the fly and estimates the rover position and velocity in real-time.

Figure 9:
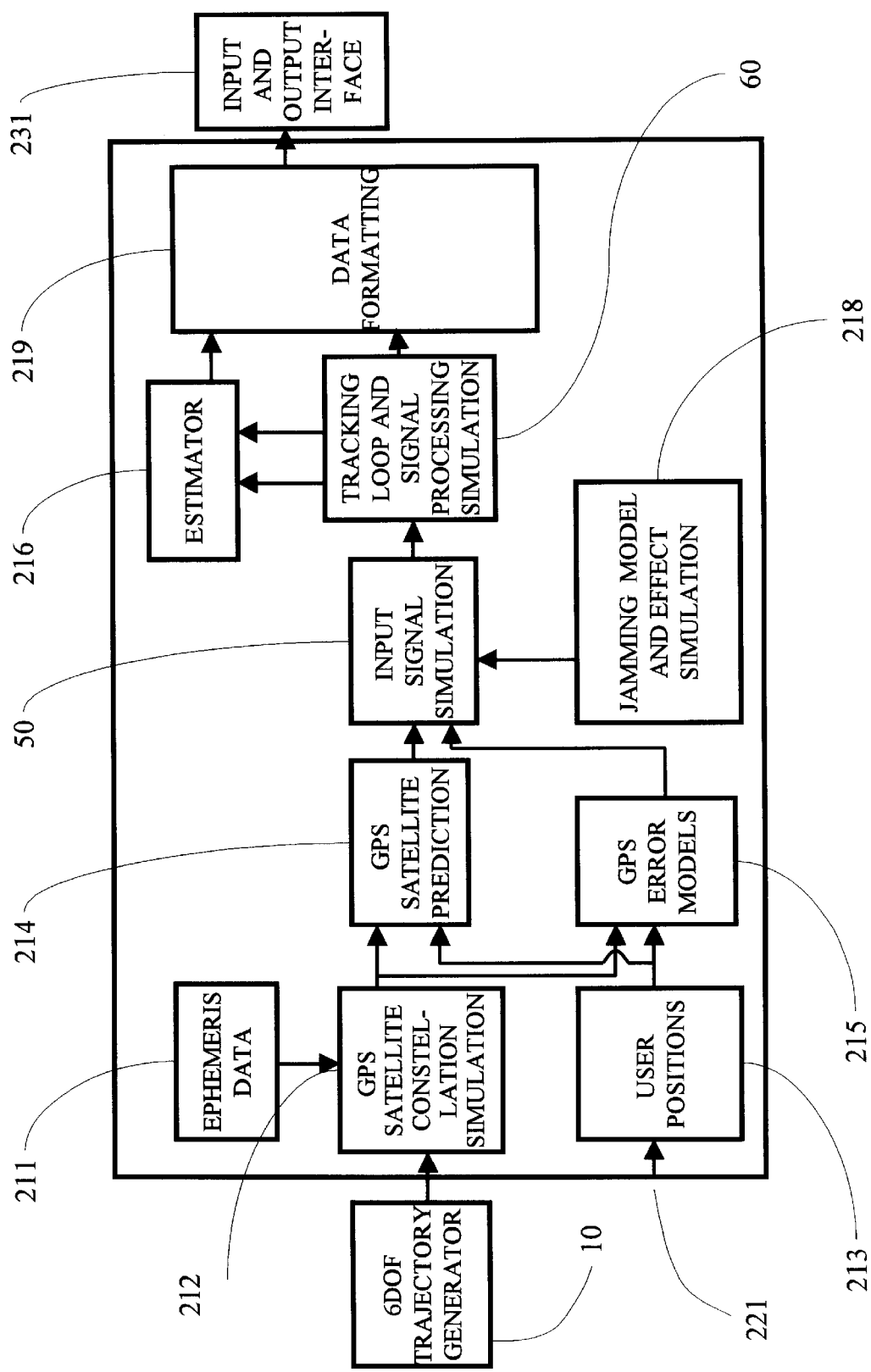
FIG. 9 is a block diagram of the real-time global positioning system simulation method with tracking loop model according to the above preferred embodiment of the present invention.

The detailed simulation method is illustrated in FIG. 9. The detailed GPS receiver model incorporates an input signal simulation 50 and a tracking loop and signal processing simulation 60 to replace the raw data generation 217 in the simplified model as shown in FIG. 3. The tracking loop and signal processing simulation 60 can accurately represent the characteristics and performance of the real GPS receiver 31.

Figure 10:
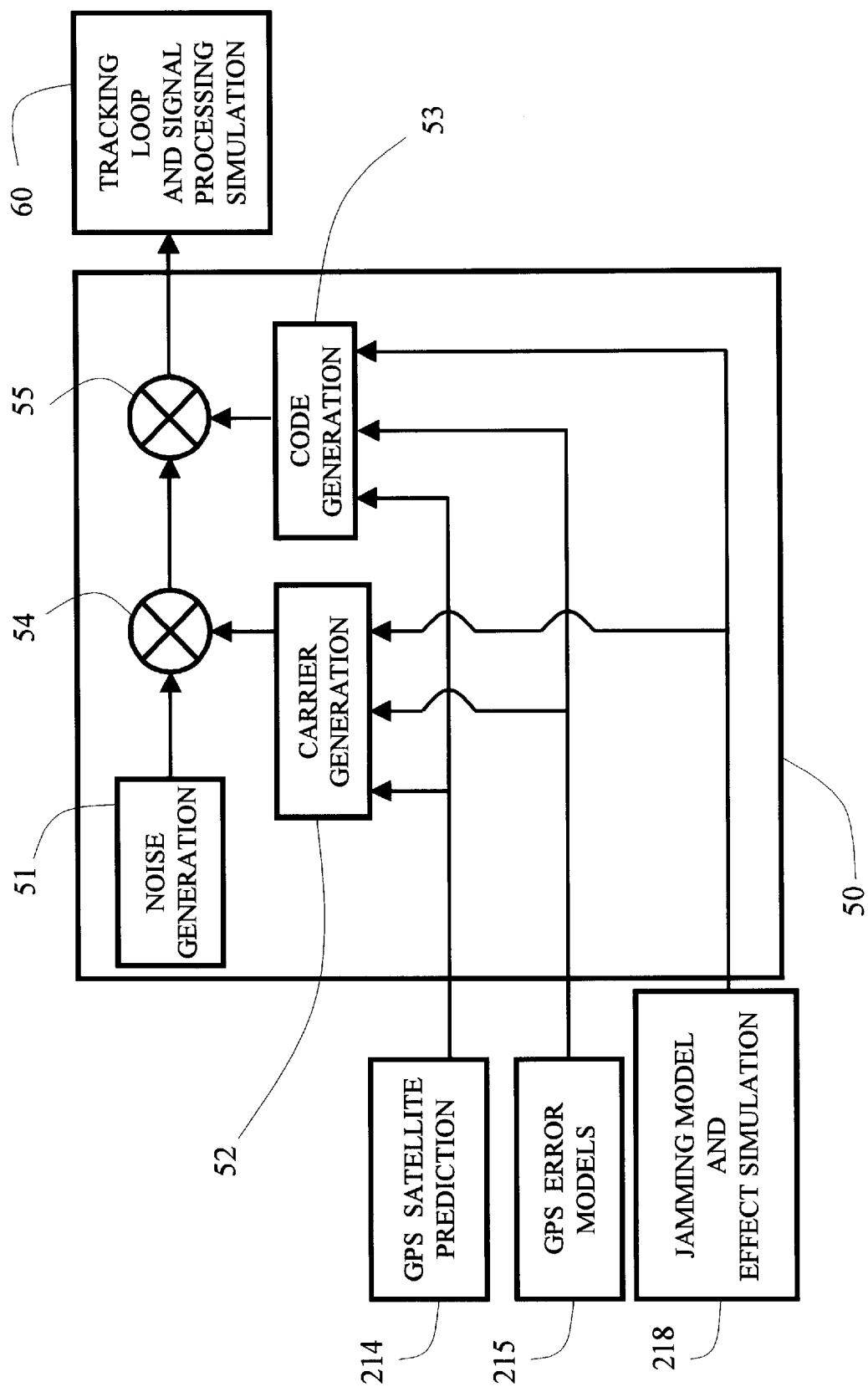
FIG. 10 is a block diagram of a global positioning system signal generation method according to the above preferred embodiment of the present invention.

Referring to FIG. 10, the input signal simulation 50 generates a GPS spread spectrum signal at an intermediate frequency (IF), which comprises a noise generation 51 for generating a white noise using a random number method, a carrier generation 52 for creating a sine wave at a defined intermediate frequency, a code generation 53 adapted for generating a coarse acquisition (C/A) code or a precision (P) code, a first multiplier 54 for multiplying a white noise from the noise generation 51 and a sine signal from the carrier generation 52, and a second multiplier 55 for multiplying an output of the first multiplier 54 by the C/A code or P code generated by the code generation 53.

Figure 11:
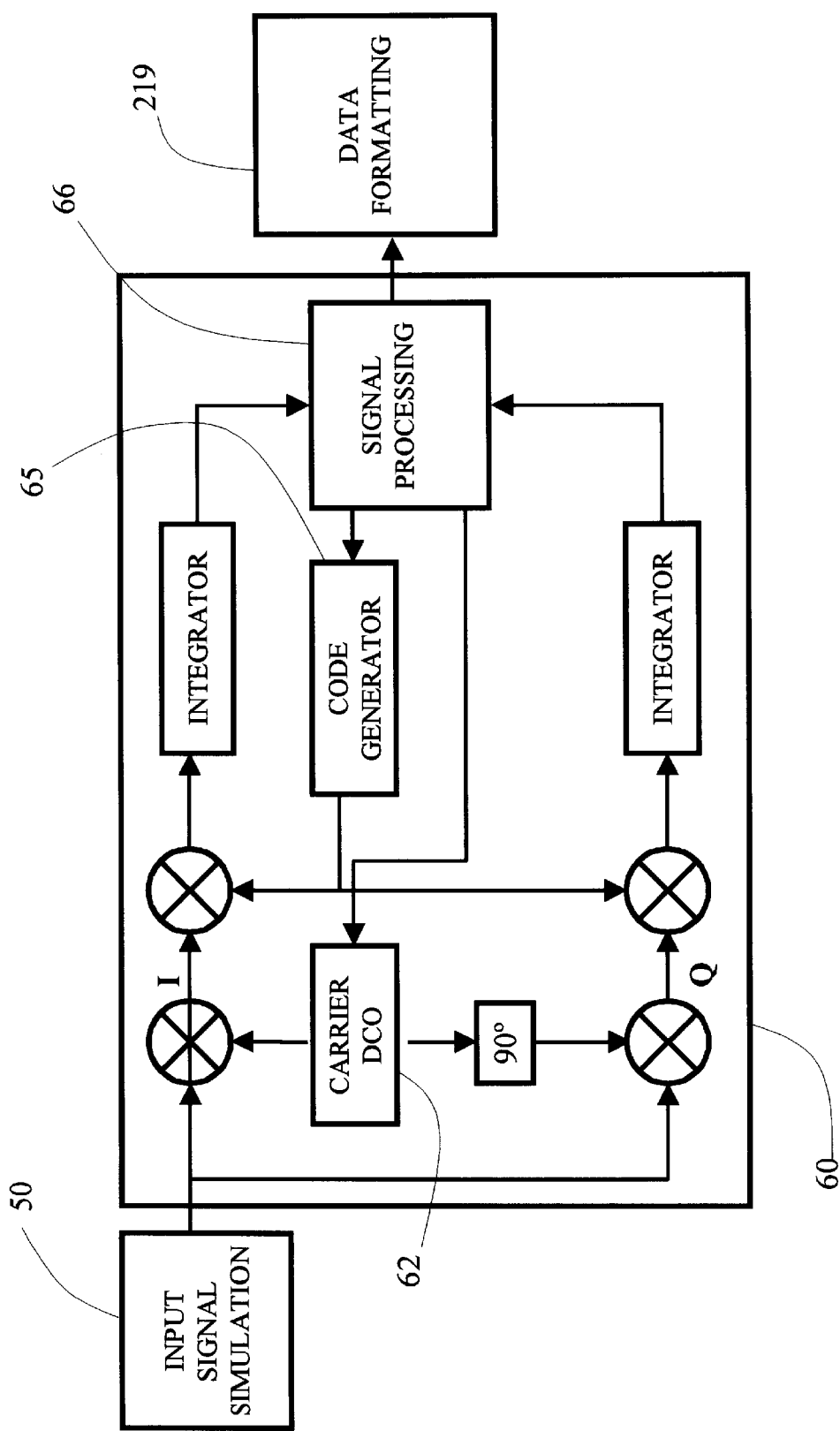
FIG. 11 is a block diagram of a global positioning system tracking loop simulation method according to the above preferred embodiment of the present invention.

FIG. 11 illustrates an implementation of one channel of the tracking loop and signal processing simulation 60. A modulated IF signal coming from the input signal simulation 50 is the input signal of the tracking loop and signal processing simulation 60. A signal processing 66 drives a carrier DCO 62 to generate a sine wave at the tracked frequency that is close to the intermediate frequency (IF). The deviation between the frequency of the generated sine wave and the input IF is called frequency tracking error. The signal processing 66 also drives a code generation 65 to produce the C/A code or P code same as the code generation 53.

Figure 12:
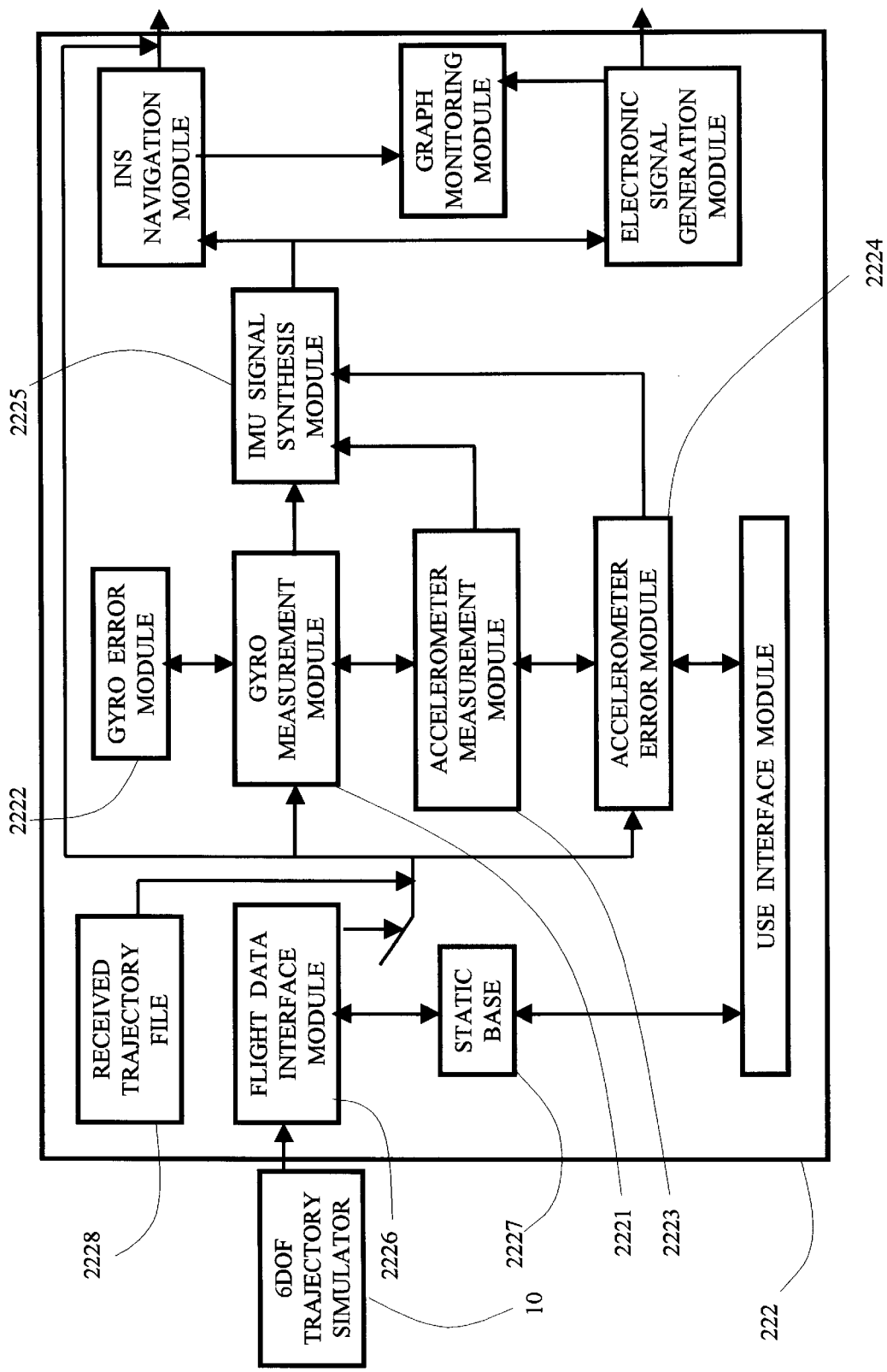
FIG. 12 is a block diagram of an inertial sensor simulation method according to the above preferred embodiment of the embodiment of the present invention.

Referring to FIG. 12, the IMU simulation module 222 as shown in FIG. 2 comprises a gyro measurement model 2221, a gyro error model 2222, an accelerometer model 2223, an accelerometer error model 2224, and an IMU signal synthesis module 2225. The real-time trajectory data generated by the 6DOF trajectory generator 10 drives the gyro measurement model 2221 and the gyro error model 2222 to simulate a real gyro's characteristics and performance to form simulated gyro measurements and error which are combined by using an adder. The 6DOF trajectory data also drives the accelerometer measurement model 2223 and the accelerometer error model 2224 to simulate a real accelerometer's characteristics and performance to form simulated accelerometer measurements and error which are also combined by using an adder. The simulated gyro and accelerometer measurement data are processed by the IMU signal synthesis module 2225 to meet a specific protocol.

Figure 13:
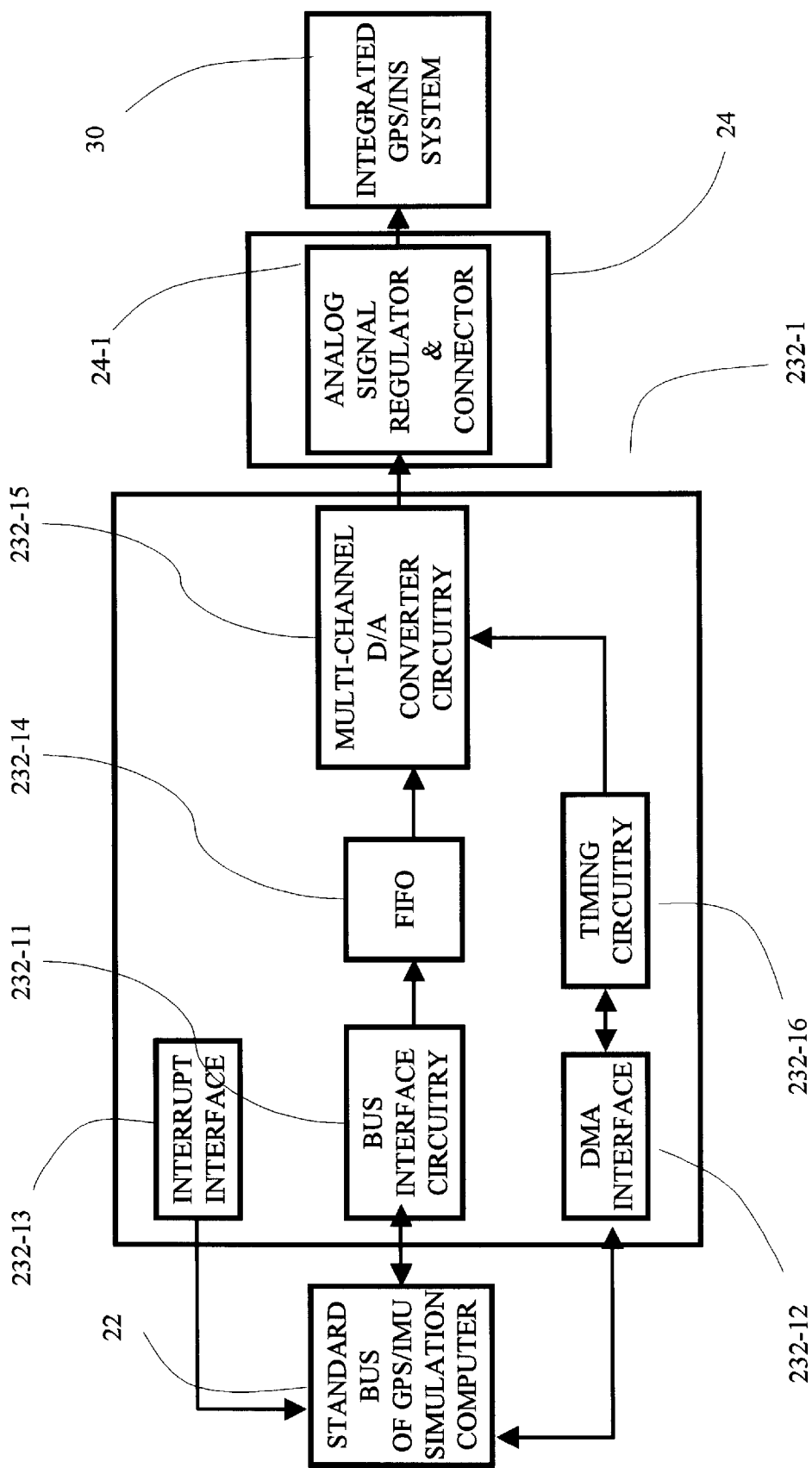
FIG. 13 is a block diagram of an analog signal interface according to the above preferred embodiment of the present invention.
Figure 14:
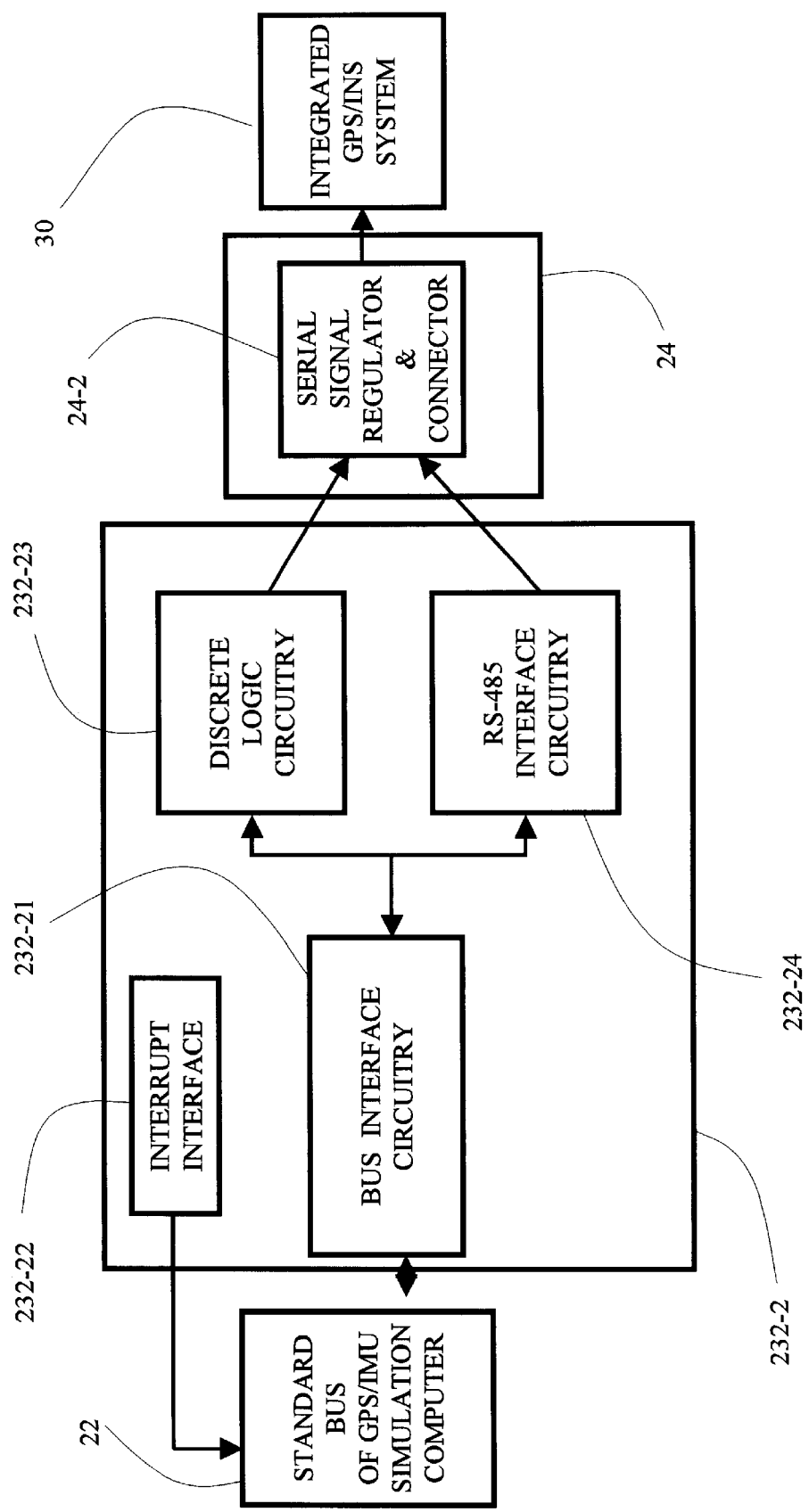
FIG. 14 is a block diagram of a serial signal interface according to the above preferred embodiment of the present invention.
Figure 15:
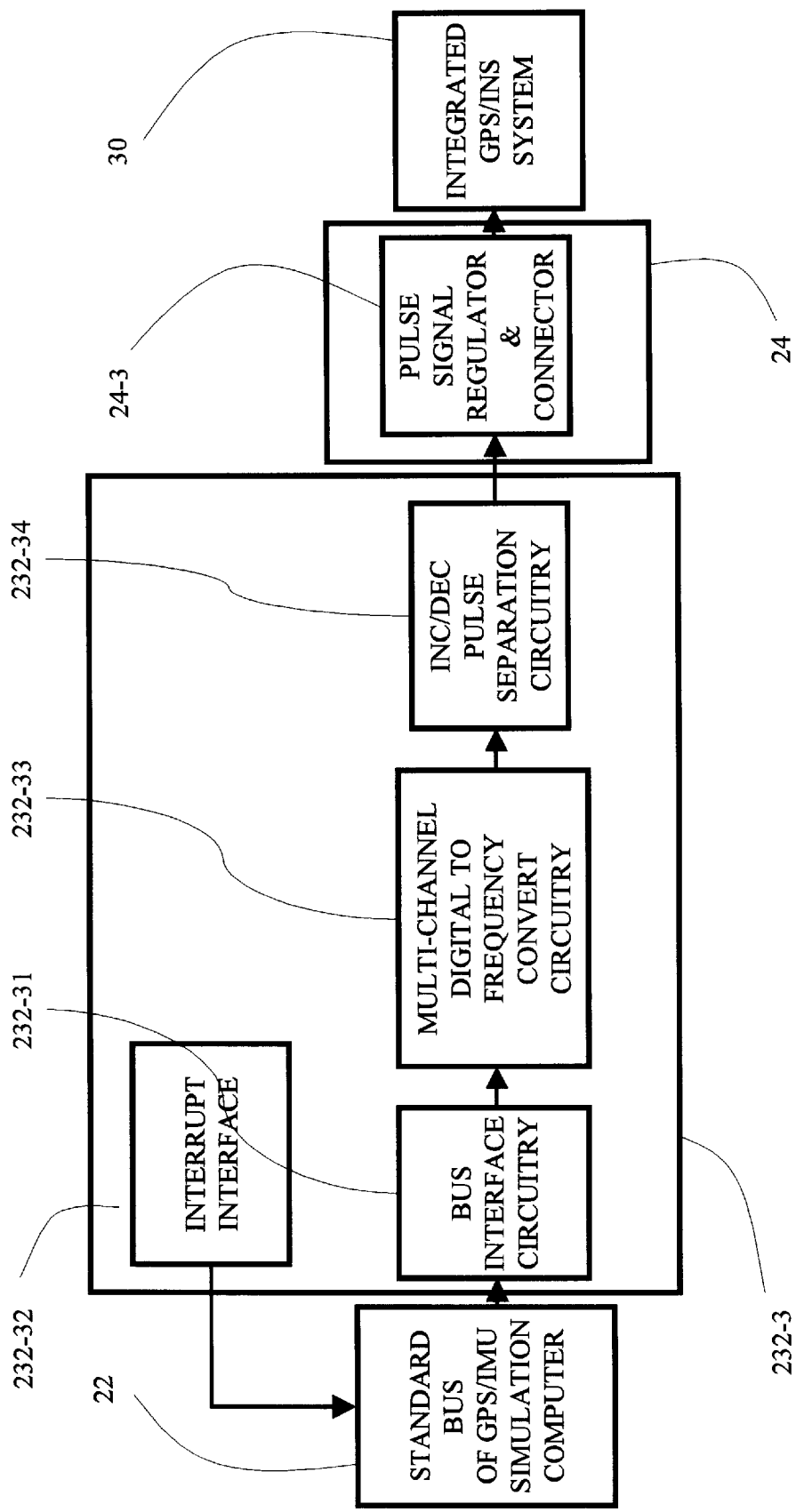
FIG. 15 is a block diagram of a pulse signal interface according to the above preferred embodiment of the present invention.
Figure 16:
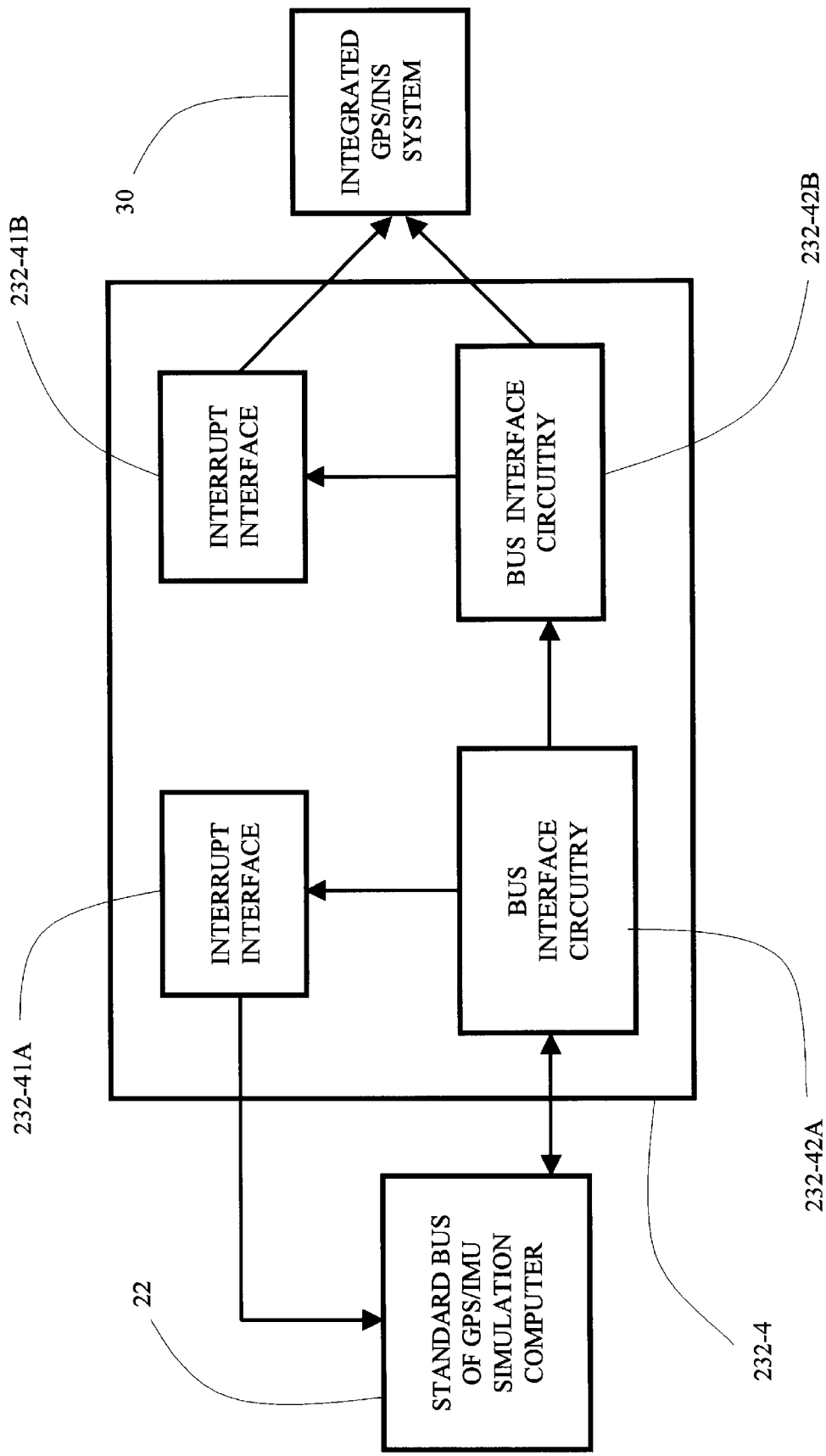
FIG. 16 is a block diagram of a parallel digital signal interface according to the above preferred embodiment of the present invention.

The IMU input/output interface 232 as shown in FIG. 2 for IMU simulation includes an analog signal interface 232-1 (as shown in FIG. 13), a serial signal interface 232-2 (as shown in FIG. 14), a pulse signal interface 232-3 (as shown in FIG. 15), and a parallel digital signal interface 232-4 (as shown in FIG. 16). These interfaces 232-1, 232-2, 232-3, 232-4 are used to convert the simulated IMU measurement data into one kind of signal that can be injected into the Integrated GPS/INS System 30. The generated signals must be identical to those signals produced by the real IMU device 32 that is replaced by the GPS/IMU simulation system 20. There are many types of gyros and accelerometers which are fabricated by different manufacturers and have various signal types and connector requirements. Therefore, one of the core technologies in the GPS/IMU simulation system 20 is the electronic signal generation and its interface to the installed integrated GPS/INS system 30. The software implements the IMU measurement simulation, and the hardware converts the simulated IMU outputs into electronic signals which are injected into the installed integrated GPS/INS system 30. The injected signals must be compatible with the electronics of the on-board GPS/INS system and the injection method must present the least intrusion to the installed integrated GPS/INS system 30.

Generally, the outputs of the real IMU device 32 are analog signals, especially for low performance IMUs, which are often used with the GPS receiver 31 to form an integrated system. The analog interface 232-1 is a multi-channel D/A converter circuit board for generating analog IMU signals, which comprises a bus interface circuitry 232-11, a DMA interface 232-12, and an interrupt interface 232-13, as shown in FIG. 13. All these interfaces 232-11, 232-12, 232-13 are connected to the standard bus of the GPS/IMU simulation computer 22. The analog interface 232-1 further comprises a FIFO circuitry 232-14 connected to the bus interface circuitry 232-11, a multi-channel D/A converter circuitry 232-15 connected between the FIFO circuitry 232-14 and an analog signal regulator and/or isolator 24-1 of the signal regulator and connector board 24, and a timing circuitry 232-16 connected between the DMA interface 232-12 and the multi-channel D/A converter circuitry 232-15.

Since most IMU manufacturers trend to embed a high performance microprocessor into the IMU device to form a so-called "smart" IMU, in which the IMU output signals are sent out by the microprocessor through a standard serial bus, for example, RS-422/485, 1533 bus, etc., as shown in FIG. 14. The serial signal interface 232-2 is a multi-channel RS-422/485 communication control circuit board for generating serial IMU signals, which comprises a bus interface circuitry 232-21 connected with the standard bus of the GPS/IMU simulation computer 22, an interrupt interface 232-22 connected between the bus interface circuitry 232-21 and the standard bus of the GPS/IMU simulation computer 22, a discrete logic circuitry 232-23 connected between the bus interface circuitry 232-21 and a serial signal regulator and connector 24-2 of the signal regulator and connector board 24, and an RS-485 interface circuitry 232-24 connected between the bus interface circuitry 232-21 and the signal regulator and connector 24-2 of the signal regulator and connector board 24.

Due to the fact that most high performance gyros and accelerometers provide pulse outputs, RLG and FOG are inherently digital sensors, and many high performance electro-mechanical gyros and accelerometers have a pulse modulated force rebalance loop. Therefore, pulse output signals have many advantages over analog signals. As shown in FIG. 15, the pulse signal interface 232-3 is a multi-channel digitally controlled frequency generator circuit board for producing pulse IMU signals, which comprises a bus interface circuitry 232-31 connected with the standard bus of the GPS/IMU simulation computer 22, an interrupt interface 232-32 connected between the bus interface circuitry 232-31 and the standard bus of the IMU simulation computer 22, a multi-channel digital to frequency converter circuitry 232-33 connected with the bus interface circuitry 232-31, and a Inc/Dec pulse separation circuitry 232-34 connected between the multi-channel digital to frequency convert circuitry 232-33 and a pulse signal regulator and connector 24-3 of the signal regulator and connector board 24.

Some IMUs have embedded logic circuits or microprocessors which can output parallel digital signals or even implement a standard parallel bus. This type of IMU can send signals to the parallel interface of the integrated GPS/INS computer or to the backplane bus of the navigation system. As shown in FIG. 16, the parallel digital signal interface 232-4 comprises two sets of interrupt interfaces 232-41a, 232-41b and bus interface circuitries 232-42a, 232-42b, wherein the first set of the interrupt interface 232-41a and the bus interface circuitry 232-42a are mutually connected and respectively connected to the standard bus of GPS/IMU simulation computer 22 and the second set of the interrupt interface 232-41b and the bus interface circuitry 232-42b are also mutually connected and respectively connected to a standard bus of the GPS/INS navigation computer 33, and that the first bus interface circuitry 232-42a is connected to the second bus interface circuitry 232-42b.

According to the requirements of the IMU output signals, different types of signal generation circuits are designed to produce a specific type of signal required by a specific simulation task. These signal generation circuits are designed as a series of optional modules. Signal module design is based on the modularized IMU simulation computer 22 architecture design. According to the practical IMU product to be simulated, a specific type of signal generation board is chosen to produce the required electronic signals that will be injected into the GPS/INS navigation computer 33.

The Ethernet network controller board 21, as shown in FIG. 2, is used to receive real-time vehicle flight trajectory data from the 6DOF trajectory generator 10. The 6DOF trajectory generator 10 and the real-time NU simulation system 20 can also been connected by a standard serial communication port such as RS-422/485, according to the application requirement.

As shown in FIGS. 1 and 2, the signal regulator and connector board 24 is used to convert the electronic signals produced by the signal generator into the required electrical specifications and form a suitable connector so that they can be directly injected into the installed integrated GPS/INS computer (such as the navigation computer) 33 of the GNC avionics on-board vehicle, i.e. the integrated GPS/INS system 30. The signal regulator and connector board 24 is designed for the specific user according to the specific IMU used in the system. This is because even if two IMUs have the same type of signal, they often have different signal ranges, scale factors, voltages, currents, and different connector arrangements. It usually comprises an amplifier, a buffer, a coupler and sometimes logic. Of course, it also forms a suitable connector for the specific installed system in order to replace the real IMU directly.

The coupled real-time IMU and GPS simulation are inherently complex issues since the real IMU in the GPS/INS system is a self-contained device and the GPS receiver in the GPS/INS system cannot generate dynamic measurements when the vehicle does not move. For the IMU, it produces inertial measurements by itself without receiving any signal from the outside. Accordingly, when the vehicle is stationary, the outputs of the real IMU device 32 and the GPS receiver 31 are constant, so that in the dynamic test of the installed integrated GPS/INS system 30, the real IMU device 32 and the GPS receiver 31 in the vehicle have to be separated from the system and replaced by the coupled real-time GPS/IMU simulation system 20 of the present invention. This replacement inherently causes an intrusion to the installed avionics system, i.e. the integrated GPS/INS system 30 according to the present embodiment.

Moreover, at present, there is no interface standard for IMU signals and connectors and there are many types of gyros and accelerometers which are fabricated by different manufacturers and have various signal types and connector requirements. Therefore, the core technology in the coupled real-time GPS/IMU simulation system 20 is the electronic signal generation and its interface(s) to the installed integrated GPS/INS system 30. The software implements the IMU measurement modules and error modules according to the real-time flight trajectory data, sensor models and parameters. The hardware converts the simulated IMU outputs into electronic signals which are injected into the installed integrated GPS/INS system 30. The injected signals must be compatible with the electronics of the on-board integrated GPS/INS system 30 and the injection method must present the least intrusion to the installed integrated GPS/INS system 30. The coupled real-time GPS/IMU simulation system 20 is a practical equipment that resolves all these problems.

It is worth to mention that the software of the coupled real-time GPS/IMU simulation system 20 can be modified to produce a more efficient user interface and even includes a 6DOF trajectory generator in the coupled real-time GPS/IMU simulation system 20.

Referring to FIG. 1, a test analysis system, the data acquisition and performance evaluation system 40 is further independently connected between the 6DOF trajectory generator 10 and the integrated GPS/INS system 30, wherein a reference trajectory is sent to the test analysis system 40 which is compared with on-board system solutions. The comparison of trajectory is used in two circumstances, one is for the coupled real-time GPS/IMU simulation system 20 accuracy verification, the other is used in a practical test to evaluate the performances of the integrated GPS/INS system 30.

Referring to FIG. 4, the present invention can work under two modes. When the operation mode is one the switch 2161 sends simulated GPS measurement data to the Kalman filter 2163. In mode one only the rover GPS receiver is simulated in the GPS simulation module 221. When the operation mode is two the switch 2161 sends simulated rover and reference GPS receiver measurements to the differential filter 2162. Under mode two the differential GPS is simulated in the GPS simulation module 221 to test the more accurate differential GPS/IMU navigation system.

In view of the performance evaluation of the integrated GPS/INS system 30, the data produced by the 6DOF trajectory generator 10 is the ideal reference for the test mission. Using the simulated real-time GPS and IMU signals, the integrated GPS/INS system 30 can resolve a vehicle trajectory. Comparing the ideal trajectory and the system resolved trajectory, we can evaluate the performance of the integrated system. Usually, the 6DOF trajectory data can produce the following flight data:

1. Simulation time tag.
2. Geodetic position, including altitude, longitude, and height above sea level.
3. Position vector in ECIZ (an Earth Centered Inertial) frame.
4. Velocity vector in ECIZ frame.
5. Acceleration vector in ECIZ frame.
6. Rotation matrix from ECIZ to the B (Body) frame.
7. Angular velocity vector observed in ECIZ and resolved in the B frame.
8. Angular acceleration vector observed in ECIZ and resolved in the B frame.

The integrated GPS/INS system 30 can produce the following outputs:
1. Geodetic position, including altitude, longitude, and height above sea level.
2. Velocity vector in N frame.
3. Acceleration vector in N frame.
4. Rotation matrix from N to the B (Body) frame.
5. Angular velocity vector observed in N and resolved in the B frame.

It is noted that after some coordinate system transformations, most of the trajectory variables can be directly compared. Generally, we can obtain (1) the position accuracy, (2) the altitude accuracy, (3) the heading accuracy, (4) the attitude accuracy, and (5) the velocity accuracy for the system performance evaluation.

What is claimed is:

1. A process of coupled real-time GPS/IMU simulation with differential GPS, comprising the steps of:

(a) inputting IMU measurement models and IMU error models into a coupled real-time GPS/IMU s imulation system which i s connected between a 6DOF trajectory generator and an integrated GPS/INS system through bypassing a real GPS receiver and a real IMU device in said integrated GPS/INS system, said IMU measurement models comprising gyro measurement model and accelerometer measurement model, said IMU error models comprising said gyro error model and accelerometer error model;

(b) producing real-time trajectory data from said 6DOF trajectory generator and sending said real-time trajectory data to said coupled real-time GPS/IMU simulation system, wherein said coupled real-time GPS/IMU simulation system produces dynamic GPS rover receiver measurements and IMU signals as if a vehicle is really moving along a predetermined trajectory and also generates reference GPS receiver measurements for a simulated reference object;

(c) estimating a rover position and velocity by an estimator;

(d) generating output data, including real-time IMU data by an IMU simulation module of said coupled real-time GPS/IMU simulation system, reference and rover GPS measurement data by a GPS simulation module in said real-time GPS/IMU simulation system, rover position and velocity by said estimator in said real-time GPS/IMU simulation system;

(e) formatting said rover GPS measurement data, said reference GPS measurement data, said rover position, and said rover velocity, and converting said real-time IMU data into IMU simulated electronic signals by an IMU signal generator in said coupled real-time GPS/IMU simulation system, wherein said IMU signal generator is an interface board in a simulation computer provided in said coupled real-time GPS/IMU simulation system;

(f) processing said simulated GPS measurement data and said generated IMU simulated electronic signals by said IMU signal generator and a signal regulator and connector board to form electrical specifications and connector pin arrangement which are compatible to said integrated GPS/INS system; and (g) injecting said simulated GPS measurement data and said generated IMU simulated electronic signals into said integrated GPS/INS system, wherein when said integrated GPS/INS system is excited in dynamic operation, a performance and reliability of said integrated GPS/INS system are able to be tested and evaluated as if experiencing a real transportation test.

2. A process of coupled real-time GPS/IMU simulation with differential GPS, as recited in claim 1, in the step (c), wherein said estimator comprises a differential filter for calculating said rover position and said rover velocity by using said simulated rover and reference GPS measurement data, wherein a plurality of Kalman filters are running in parallel in an estimator bank, each of said Kalman filter having a GPS carrier phase integer ambiguity set and a corresponding weight being calculated in a weight bank, wherein a total sum of weights in said weight bank is equal to 1.

3. A process of coupled real-time GPS/IMU simulation with differential GPS, as recited in claim 2, wherein said differential filter is contributed by said estimator bank and said corresponding weight bank, an IASS which is an intermediate ambiguity search strategy, and a search window having a plurality of time epochs, wherein the step (c) further comprises the steps of:

(c.1) setting up said search window having said plurality of time epochs;

(c.2) searching an integer ambiguity set at said first time epoch of said search window by using said IASS, wherein said integer ambiguity set becomes a member of said estimator bank while there is no member in said estimator bank before said first time epoch, wherein based on said integer ambiguity set and phase measurements, said rover position is estimated in said estimator bank, and then a corresponding weight is calculated in said weight bank, as a result, an optimal rover position for said time epoch is equal to said rover position multiplied by said corresponding weight, and based on said optimal rover position and said Doppler shifts, said rover velocity is estimated;

(c.3) following the step (b) first at said second time epoch, searching said integer ambiguity set at said second time epoch of said search window by using said IASS;

(c.4) following the step (c.3) for said other time epochs of said search window, wherein at said last time epoch N of said search window, after said search of said IASS, said estimator bank and said corresponding weight bank are completely established;

(c.5) following the step (b) first at said $(N+1)^{th}$ time epoch, inputting said phase measurements into each of said Kalman filters of said differential filter, wherein based on each of said integer ambiguity sets and said phase measurements, an individual rover position is estimated in said estimator bank and each corresponding weight is calculated accumulatively in said weight bank to an associated weight, therefore said optimal rover position is equal to a sum of said individual rover position multiplied by said associated weight, and further based on said optimal rover position and Doppler shifts, said rover velocity is estimated;

(c.6) following the step (c.5) after said $(N+1)^{th}$ time epoch until a criterion is met, wherein after said criterion is met, said estimator bank and said weight bank stop functioning, and during a confirmation period, that is from said first time epoch of said search window to said last time epoch when said estimator bank and said weight bank stop functioning, said estimator bank and said weight bank continuously identify a correct integer ambiguity set and estimate said rover position in real-time, wherein said weight corresponding to said correct integer ambiguity is approaching to one while said other integer ambiguity sets are converging to zero; and (c.7) estimating said rover position and velocity by using said least-squares estimated method after fixing integer ambiguities; as new satellites or cycle slips occur, the process (i.e. steps (c.1)–(c.7)) will be initiated.

4. A process of coupled real-time GPS/IMU simulation with differential GPS, as recited in claim 3, in the step (c.3), wherein when said integer ambiguity set is same as one of said previous time epoch, said number of said Kalman filter remains, wherein based on said integer ambiguity set and said phase measurements, said rover position is estimated in said estimator bank and said corresponding weight is accumulatively calculated in said weight bank, as a result, said optimal rover position is equal to said rover position multiplied by said associated weight and based on said optimal rover position and said Doppler shifts, said rover velocity is estimated.

5. A process of coupled real-time GPS/IMU simulation with differential GPS, as recited in claim 3, in the step (c.3), wherein when said integer ambiguity set is different from one of said previous time epoch, said current integer ambiguity set becomes a new member of said estimator bank, that is a number of said Kalman filters increases by one, wherein based on each of said integer ambiguity sets and said same phase measurements, an individual rover position is estimated in said estimator bank and a calculation of each corresponding weight is recalculated from scratch in said weight bank, and therefore said optimal rover position is equal to a sum of said individual rover position multiplied by said associated weight, wherein based on said optimal rover position and said Doppler shifts, said rover velocity is estimated.

6. A process of coupled real-time GPS/IMU simulation with differential GPS, as recited in claims 3, 4 or 5, wherein said IASS comprises the steps of:

resolving primary double difference wide lane ambiguities in a primary double difference wide lane ambiguity resolution module, wherein a priori information of said rover position obtained from ionosphere-free pseudorange measurements and an approximated double difference wide lane ambiguities are combined with said primary double difference wide lane phase measurements to estimate said rover position and said primary double difference wide lane ambiguities;

establishing an ambiguity search domain based on said estimated primary double difference wide lane ambiguities and said corresponding cofactor matrix;

searching for an ambiguity set by using a "simplified" least-squares search estimator;

computing said rover position based on said fixed primary double difference wide lane ambiguities in a position calculation module;

fixing secondary double difference wide lane ambiguities by applying said primary wide-lane-ambiguity-fixed rover position solution into said secondary double difference wide lane phase measurements;

calculating approximated double difference narrow lane ambiguities and then using said extrawidelaning technique module to resolve double difference narrow lane ambiguities; and calculating a L1 and L2 ambiguities in a L1 and L2 ambiguity resolution module from said combination of said double difference wide lane ambiguities and said double difference narrow lane ambiguities.

7. A process of coupled real-time GPS/IMU simulation with differential GPS, as recited in claim 6, after the above step (g), further comprises an additional step of collecting test data from s aid integrated GPS/INS system by a data acquisition and performance evaluation system connected between said 6DOF trajectory generator and said integrated GPS/INS system, so as to compare said real-time trajectory data from said 6DOF trajectory generator with integrated GPS/INS estimated vehicle trajectory data output from said integrated GPS/INS system in order to evaluate whether said integrated GPS/INS system works properly.

8. A process of coupled real-time GPS/IMU simulation with differential GPS, as recited in claims 1, 2, 3, 4 or 5, after the above step (g), further comprises an additional step of collecting test data from said integrated GPS/INS system by a data acquisition and performance evaluation system connected between said 6DOF trajectory generator and said integrated GPS/INS system, so as to compare said real-time trajectory data from said 6DOF trajectory generator with integrated GPS/INS estimated vehicle trajectory data output from said integrated GPS/INS system in order to evaluate whether said integrated GPS/INS system works properly.

9. A coupled real-time GPS/IMU simulation system, adapted to connect between a 6DOF trajectory generator and an integrated GPS/INS system, comprising:

an IMU signal generator which includes a GPS simulation input/output interface and an IMU simulation input/output interface;

a simulation computer which comprises a GPS simulation module for performing GPS simulation and an IMU simulation module for performing IMU simulation, wherein said GPS simulation module receives real-time trajectory data from said 6DOF trajectory generator and generates dynamic and static GPS measurements including pseudoranges, carrier phases, and Doppler shifts, and positioning information including location information and velocity information, said dynamic and static GPS measurements being formatted to simulated GPS measurement data which are sent through said GPS simulation input/output interface to said GPS simulation module for GPS tracking loop aiding to facilitate said integrated GPS/INS system, said IMU simulation module receiving said real-time trajectory data from said 6DOF trajectory generator and producing IMU simulated measurements, said IMU simulation input/output interface projecting said IMU measurements into specific simulated electronic signals; and a signal regulator and connector board for converting electronic signals from said IMU simulation input/output interface into said simulated electronic signals, wherein said simulated electronic signals, coupled with said simulated GPS measurement data, are injected into said integrated GPS/INS system which causes an on-board GPS/INS navigation computer installed therein into working as if experiencing a real transportation test.

10. A coupled real-time GPS/IMU simulation system, as recited in claim 9, wherein said GPS simulation module comprises:

a GPS satellite constellation simulation which is triggered by said real-time trajectory data from said 6DOF trajectory generator for reading orbit parameters, satellite clock parameters, and atmospheric parameters from ephemeris data, which are stored in said GPS/IMU simulation computer of said coupled real-time GPS/IMU simulation system, and calculating a position and velocity vector for GPS satellites in an Earth-Centered-Earth-Fixed coordinate system which is connected between said 6DOF trajectory generator and said simulation computer;

user positions which are given by and based on said 6DOF trajectory data respectively;

a GPS satellite prediction using an information from said GPS satellite constellation simulation and said user positions to determine visible GPS satellites and elevation, azimuth, and Doppler shifts thereof;

a GPS Error Models for using said information from said GPS satellite constellation simulation and a user initial position of said user positions to calculate error correction terms, including satellite clock correction, relativistic, ionospheric delay, tropospheric delay, and group delay;

a jamming model and effect simulation for simulating an impact of jamming on GPS signal reception, wherein an array of jammers defined by location, type, and effective radiating power is constructed and input to said jamming model and effect simulation;

a raw data generation using information from said user positions, said GPS satellite prediction, said GPS error models, and said jamming model and effect simulation to calculate simulated pseudorange, carrier phase, and delta range for said visible satellites;

an estimator for calculating the GPS rover position and velocity using simulated raw data from said raw data generation; and a data formatting means for formatting said position and velocity information and said simulated raw data along with said ephemeris data according to a specific protocol, wherein said data formatting means is an integral part which allows said simulated GPS measurement data having a format identical to a real GPS receiver used in said integrated GPS/INS system.

11. A coupled real-time GPS/IMU simulation system, as recited in claim 10, wherein said estimator comprises a Kalman filter which calculates said rover position and velocity by using said simulated rover GPS measurement data.

12. A coupled real-time GPS/IMU simulation system, as recited in claim 11, wherein said estimator further comprises a differential filter which calculates said rover position and velocity by using said simulated rover and reference GPS measurement data.

13. A coupled real-time GPS/IMU simulation system, as recited in claim 10, wherein said estimator comprises a differential filter which calculates said rover position and velocity by using said simulated rover and reference GPS measurement data.

14. A coupled real-time GPS/IMU simulation system, as recited in claim 9, wherein said GPS simulation module comprises:

a GPS satellite constellation simulation which is triggered by said 6DOF trajectory data from said 6DOF trajectory generator for reading orbit parameters, satellite clock parameters, and atmospheric parameters from ephemeris data, which are stored in said GPS/IMU simulation computer of said coupled real-time GPS/IMU simulation system, and calculating a position and velocity vector for GPS satellites in an Earth-Centered-Earth-Fixed coordinate system which is connected between said 6DOF trajectory generator and said simulation computer;

user positions which are given by and based on said 6DOF trajectory data respectively;

a GPS satellite prediction using information from said GPS satellite constellation simulation and a user initial position to determine visible GPS satellites and the elevation, azimuth, and Doppler shifts thereof;

a GPS Error Models for using said information from said GPS satellite constellation simulation and said user initial position to calculate error correction terms, including satellite clock correction, relativistic, ionospheric delay, tropospheric delay, and group delay;

a jamming model and effect simulation for simulating an impact of jamming on GPS signal reception, wherein an array of jammers defined by location, type, and effective radiating power is constructed and input to said jamming model and effect simulation;

an input signal simulation for generating a GPS spread spectrum signal at an intermediate frequency (IF), which comprises a noise generation for generating a white noise using a random number method, a carrier generation for creating a sine wave at a defined intermediate frequency, a code generation adapted for selectively generating a coarse acquisition (C/A) code and a precision (P) code, a first multiplier for multiplying said white noise from said noise generation and said sine signal from said carrier generation and a second multiplier for multiplying an output of said first multiplier by said C/A code or P code generated by said code generation;

a tracking loop and signal processing simulation for accurately representing characteristics and performance of a real GPS receiver, wherein a modulated IF signal coming from said input signal simulation is an input signal of said tracking loop and signal processing simulation, said tracking loop and signal processing simulation comprising a carrier phase correction for driving a carrier DCO to generate said sine wave at said tracked frequency that is close to said intermediate frequency (IF), a deviation between said tracked frequency of said generated sine wave and said input IF being called frequency tracking error, and a code phase correction for driving a code generation to produce said C/A code or P code same as said code generation;

an estimator for calculating the GPS rover position and velocity by using simulated raw data from said raw data generation; and a data formatting means for formatting said position and velocity information and said simulated raw data along with said ephemeris data according to a specific protocol, wherein said data formatting means is an integral part which allows said simulated GPS measurement data having a format identical to a real GPS receiver used in said integrated GPS/INS system.

15. A coupled real-time GPS/IMU simulation system, as recited in claim 14, wherein said estimator comprises a Kalman filter which calculates said rover position and velocity by using said simulated rover GPS measurement data.

16. A coupled real-time GPS/IMU simulation system, as recited in claim 15, wherein said estimator further comprises a differential filter which calculates said rover position and velocity using said simulated rover and reference GPS measurement data.

17. A coupled real-time GPS/IMU simulation method with differential GPS, as recited in one of claims 9 to 16, wherein said IMU simulation module comprises a gyro measurement model, a gyro error model, an accelerometer model, an accelerometer error model, and an IMU signal synthesis module, said real-time trajectory data generated by said 6DOF trajectory generator driving said gyro measurement model and said gyro error model to simulate characteristics and performance of a real gyro to form simulated gyro measurements and error which are combined by using an adder, moreover said real-time trajectory data drive said accelerometer measurement model and said accelerometer error model to simulate characteristics and performance of a real accelerometer to form simulated accelerometer measurements and error which are also combined by using said adder, wherein said simulated gyro and accelerometer measurement data are processed by said IMU signal synthesis module to meet a specific protocol.

18. A coupled real-time GPS/IMU simulation system, as recited in claims 17, wherein said IMU input/output interface includes an analog interface which is a multi-channel D/A converter circuit board for generating analog IMU signals and comprises a bus interface circuitry, a DMA interface, and an interrupt interface which are connected to a standard bus of said GPS/IMU simulation computer, said analog interface further comprising a FIFO circuitry connected to said bus interface circuitry, a multi-channel D/A converter circuitry connected between said FIFO circuitry and an analog signal regulator and isolator of said signal regulator and connector board, and a timing circuitry connected between said DMA interface and said multi-channel D/A converter circuitry.

19. A coupled real-time GPS/IMU simulation system, as recited in claim 18, further comprising a data acquisition and performance evaluation system, which is independently connected between said 6DOF trajectory generator and said integrated GPS/INS system, for comparing said real-time trajectory data from said 6DOF trajectory generator with integrated GPS/INS estimated vehicle trajectory data output from said integrated GPS/INS system in order to evaluate whether said integrated GPS/INS system works properly.

20. A coupled real-time GPS/IMU simulation system, as recited in claim 17, wherein said IMU input/output interface includes a serial signal interface which is a multi-channel RS422/485 communication control circuit board for generating serial IMU signals and comprises a bus interface circuitry connected with said standard bus of said GPS/IMU simulation computer, an interrupt interface connected between said bus interface circuitry and said standard bus of said GPS/IMU simulation computer, a discrete logic circuitry connected between said bus interface circuitry and a serial signal regulator and connector of said signal regulator and connector board, and an RS485 interface circuitry connected between said bus interface circuitry and a signal regulator and connector of said signal regulator and connector board.

21. A coupled real-time GPS/IMU simulation system, as recited in claim 20, further comprising a data acquisition and performance evaluation system, which is independently connected between said 6DOF trajectory generator and said integrated GPS/INS system, for comparing said real-time trajectory data from said 6DOF trajectory generator with integrated GPS/INS estimated vehicle trajectory data output from said integrated GPS/INS system in order to evaluate whether said integrated GPS/INS system works properly.

22. A coupled real-time GPS/IMU simulation system, as recited in claim 17, wherein said IMU input/output interface includes a pulse signal interface which is a multi-channel digitally controlled frequency generator circuit board for producing pulse IMU signals and comprises a bus interface circuitry connected with said standard bus of said GPS/IMU simulation computer, an interrupt interface connected between said bus interface circuitry and said standard bus of said IMU simulation computer, a multi-channel digital to frequency converter circuitry connected with said bus interface circuitry, and an Inc/Dec pulse separation circuitry connected between said multi-channel digital to frequency convert circuitry and a pulse signal regulator and connector of said signal regulator and connector board.

23. A coupled real-time GPS/IMU simulation system, as recited in claim 22, further comprising a data acquisition and performance evaluation system, which is independently connected between said 6DOF trajectory generator and said integrated GPS/INS system, for comparing said real-time trajectory data from said 6DOF trajectory generator with integrated GPS/INS estimated vehicle trajectory data output from said integrated GPS/INS system in order to evaluate whether said integrated GPS/INS system works properly.

24. A coupled real-time GPS/IMU simulation system, as recited in claim 17, wherein said IMU input/output interface includes a parallel digital signal interface which comprises a first set of interrupt interface and bus interface circuitry and a second set of interrupt interface and bus interface circuitry, wherein said first set of said interrupt interface and said bus interface circuitry are mutually connected and respectively connected to a standard bus of said GPS/IMU simulation computer and said second set of said interrupt interface and said bus interface circuitry are also mutually connected and respectively connected to a standard bus of said GPS/INS navigation computer, and that said first bus interface circuitry is connected to said second bus interface circuitry.

25. A coupled real-time GPS/IMU simulation system, as recited in claim 24, further comprising a data acquisition and performance evaluation system, which is independently connected between said 6DOF trajectory generator and said integrated GPS/INS system, for comparing said real-time trajectory data from said 6DOF trajectory generator with integrated GPS/INS estimated vehicle trajectory data output from said integrated GPS/INS system in order to evaluate whether said integrated GPS/INS system works properly.

26. A coupled real-time GPS/IMU simulation system, as recited in claim 17, further comprising a data acquisition and performance evaluation system, which is independently connected between said 6DOF trajectory generator and said integrated GPS/INS system, for comparing said real-time trajectory data from said 6DOF trajectory generator with integrated GPS/INS estimated vehicle trajectory data output from said integrated GPS/INS system in order to evaluate whether said integrated GPS/INS system works properly.

27. A coupled real-time GPS/IMU simulation system, as recited in one of claims 9 to 16, wherein said IMU input/output interface includes an analog interface which is a multi-channel D/A converter circuit board for generating analog IMU signals and comprises a bus interface circuitry, a DMA interface, and an interrupt interface which are connected to a standard bus of said GPS/IMU simulation computer, said analog interface further comprising a FIFO circuitry connected to said bus interface circuitry, a multi-channel D/A converter circuitry connected between said FIFO circuitry and an analog signal regulator and isolator of said signal regulator and connector board, and a timing circuitry connected between said D/A interface and said multi-channel D/A converter circuitry.

28. A coupled real-time GPS/IMU simulation system, as recited in one of claims 9 to 16, wherein said IMU input/output interface includes a serial signal interface which is a multi-channel RS-422/485 communication control circuit board for generating serial IMU signals and comprises a bus interface circuitry connected with said standard bus of said GPS/IMU simulation computer, an interrupt interface connected between said bus interface circuitry and said standard bus of said GPS/IMU simulation computer, a discrete logic circuitry connected between said bus interface circuitry and a serial signal regulator and connector of said signal regulator and connector board, and an RS-485 interface circuitry connected between said bus interface circuitry and a signal regulator and connector of said signal regulator and connector board.

29. A coupled real-time GPS/IMU simulation system, as recited in one of claims 9 to 16, wherein said IMU input/output interface includes a pulse signal interface which is a multi-channel digitally controlled frequency generator circuit board for producing pulse IMU signals and comprises a bus interface circuitry connected with said standard bus of said GPS/IMU simulation computer, an interrupt interface connected between said bus interface circuitry and said standard bus of said IMU simulation computer, a multi-channel digital to frequency converter circuitry connected with said bus interface circuitry, and an Inc/Dec pulse separation circuitry connected between said multi-channel digital to frequency convert circuitry and a pulse signal regulator and connector of said signal regulator and connector board.

30. A coupled real-time GPS/IMU simulation system, as recited in one of claims 9 to 16, wherein said IMU input/output interface includes a parallel digital signal interface which comprises a first set of interrupt interface and bus interface circuitry and a second set of interrupt interface and bus interface circuitry, wherein said first set of said interrupt interface and said bus interface circuitry are mutually connected and respectively connected to a standard bus of said GPS/IMU simulation computer and said second set of said interrupt interface and said bus interface circuitry are also mutually connected and respectively connected to a standard bus of said GPS/INS navigation computer, and that said first bus interface circuitry is connected to said second bus interface circuitry.

31. A coupled real-time GPS/IMU simulation system, as recited in one of claims 9 to 16, further comprising a data acquisition and performance evaluation system, which is independently connected between said 6DOF trajectory generator and said integrated GPS/INS system, for comparing said real-time trajectory data from said 6DOF trajectory generator with integrated GPS/INS estimated vehicle trajectory data output from said integrated GPS/INS system in order to evaluate whether said integrated GPS/INS system works properly.

32. A coupled real-time GPS/IMU simulation system, as recited in claim 14, wherein said estimator comprises a differential filter which calculates said rover position and velocity using said simulated rover and reference GPS measurement data.

\* \* \* \* \*